United States Patent
Lokowandt et al.

(10) Patent No.: US 8,190,465 B2
(45) Date of Patent: May 29, 2012

(54) MAKE-TO-SPECIFICATION PROCESS AND DATA MODEL

(75) Inventors: Bernhard Lokowandt, Heidelberg (DE); Achim Clemens, Speyer (DE); Reiner Bildmayer, Bad Schoenborn (DE); Thomas Gross-Boelting, Walldorf (DE); Klaus Reinelt, Kraichtal (DE)

(73) Assignee: SAP AG, Walldorf (DE)

( * ) Notice: Subject to any disclaimer, the term of this patent is extended or adjusted under 35 U.S.C. 154(b) by 608 days.

(21) Appl. No.: 12/340,229

(22) Filed: Dec. 19, 2008

(65) Prior Publication Data

US 2010/0161364 A1    Jun. 24, 2010

(51) Int. Cl.
*G06Q 10/00* (2012.01)

(52) U.S. Cl. .......... 705/7.25; 705/7.22; 705/28; 700/95; 700/99; 700/100

(58) Field of Classification Search .................. None
See application file for complete search history.

(56) References Cited

U.S. PATENT DOCUMENTS

| | | | | |
|---|---|---|---|---|
| 5,287,267 A * | 2/1994 | Jayaraman et al. | | 705/7.31 |
| 5,630,070 A * | 5/1997 | Dietrich et al. | | 705/7.23 |
| 5,953,707 A * | 9/1999 | Huang et al. | | 705/7.25 |
| 5,963,919 A * | 10/1999 | Brinkley et al. | | 705/28 |
| 6,151,582 A * | 11/2000 | Huang et al. | | 705/7.25 |
| 6,236,901 B1 * | 5/2001 | Goss | | 700/95 |
| 6,505,094 B2 * | 1/2003 | Pape et al. | | 700/217 |
| 6,529,797 B2 * | 3/2003 | Williams et al. | | 700/216 |
| 6,560,509 B2 * | 5/2003 | Williams et al. | | 700/216 |
| 6,611,727 B2 * | 8/2003 | Bickley et al. | | 700/99 |
| 6,615,092 B2 * | 9/2003 | Bickley et al. | | 700/99 |
| 6,816,746 B2 * | 11/2004 | Bickley et al. | | 700/99 |
| 6,950,714 B2 * | 9/2005 | Bickley et al. | | 700/100 |
| 6,999,949 B2 * | 2/2006 | Mantena et al. | | 705/400 |
| 7,054,704 B2 * | 5/2006 | Bickley et al. | | 700/100 |
| 7,058,587 B1 * | 6/2006 | Horne | | 705/7.22 |
| 7,249,068 B1 * | 7/2007 | Kakouros et al. | | 705/28 |
| 7,921,030 B1 * | 4/2011 | Verma et al. | | 705/1.1 |
| 2002/0072986 A1 * | 6/2002 | Aram | | 705/26 |
| 2002/0087227 A1 * | 7/2002 | Tozawa et al. | | 700/95 |
| 2002/0087438 A1 * | 7/2002 | Kunieda et al. | | 705/28 |
| 2002/0087477 A1 * | 7/2002 | Mantena et al. | | 705/64 |
| 2002/0122715 A1 * | 9/2002 | Pape et al. | | 414/799 |
| 2002/0123815 A1 * | 9/2002 | Bickley et al. | | 700/101 |
| 2002/0123944 A1 * | 9/2002 | Williams et al. | | 705/29 |
| 2002/0138316 A1 * | 9/2002 | Katz et al. | | 705/7 |
| 2002/0138319 A1 * | 9/2002 | Kaburagi et al. | | 705/7 |

(Continued)

OTHER PUBLICATIONS

Choudhury et al., "Uses and consequences of electronic markets: An empirical investigation in aircraft parts industry", MIS Quarterly, v22n4, pp. 471-507.*

(Continued)

*Primary Examiner* — Lynda Jasmin
*Assistant Examiner* — Gurkanwaljit Singh
(74) *Attorney, Agent, or Firm* — Fish & Richardson P.C.

(57) ABSTRACT

In various implementations, a sales order are received from a sales order requester for at least one good, wherein the sales order includes product options for ordered goods via a sales product requirement specification object. A sales order confirmation is generated at least partially based on the sales order and a plan for production of the ordered goods. The ordered goods to be produced based on the plan are allowed. And an outbound delivery request defined by a planning product requirement specification object is generated, wherein the ordered goods are delivered to the sales order requestor based on the delivery request.

18 Claims, 17 Drawing Sheets

U.S. PATENT DOCUMENTS

| | | | |
|---|---|---|---|
| 2003/0046089 A1* | 3/2003 | Menninger et al. | 705/1 |
| 2003/0050818 A1* | 3/2003 | Maie et al. | 705/8 |
| 2003/0208389 A1* | 11/2003 | Kurihara et al. | 705/7 |
| 2003/0229550 A1* | 12/2003 | DiPrima et al. | 705/28 |
| 2004/0010334 A1* | 1/2004 | Bickley et al. | 700/99 |
| 2004/0024628 A1* | 2/2004 | Eck et al. | 705/8 |
| 2004/0078253 A1 | 4/2004 | Woehler | |
| 2004/0148227 A1* | 7/2004 | Tabuchi et al. | 705/26 |
| 2004/0153187 A1* | 8/2004 | Knight et al. | 700/99 |
| 2005/0177435 A1* | 8/2005 | Lidow | 705/22 |
| 2005/0246042 A1* | 11/2005 | Bickley et al. | 700/99 |
| 2005/0283412 A1* | 12/2005 | Cheng et al. | 705/28 |
| 2006/0173728 A1* | 8/2006 | An et al. | 705/10 |
| 2008/0162266 A1 | 7/2008 | Griessmann et al. | |
| 2008/0172280 A1* | 7/2008 | Goulimis | 705/8 |
| 2009/0055796 A1 | 2/2009 | Springborn et al. | |
| 2009/0063305 A1* | 3/2009 | Kreifels et al. | 705/28 |
| 2009/0240545 A1* | 9/2009 | An et al. | 705/8 |

OTHER PUBLICATIONS

"The Effect of Commonality on Safety Stock in a Simple Inventory Model", Management Science vol. 32, No. 8, Aug. 1986 Baket et al.*

Modern Material Handling Productivity Solutions for Manufacturing, Warehousing & Distribution, A Cahners Publication, Nov. 1995, "Less Automation Means More Productivity At Sun" by Tom Feare, pp. 1-4.*

L. Li, "The Role of Inventory in Delivery-Time Competition", Management Science, 38 (1992), 182-197.*

A. Garg, et al., "Managing Product Variety: An Opertaions Perspective", in Quantitative Models for Supply Chain Management, S. Tayur, R. Ganeshan and M. Magazine (eds.), Kluwer Academic Publishers, Norwell, 1999, pp. 467-490.*

J. Song, et al, "Order-Fulfillment Performance Measures in an Assemble-to-Order System with Stochastic Leadtimes", Operations Research, vol. 47, No. 1, Jan.-Feb. 1999, pp. 131-149.*

P. Glasserman, "Leadtime-Inventory Trade-Offs in Assembnle-to-Order Systems", Operations Research, vol. 46, No. 6, Nov.-Dec. 1998, pp. 858-871.*

Svoronos, Antony, et al., "Evaluation of One-For-One Replenishment Policies for Multiechelon Inventory Systems" Management Science, vol. 37, No. 1 Copyright .COPYRGT. 1991, The Institute of Management Sciences, pp. 68-83. Jan. 1991.*

Paul, Bixler P. (2005). Demand-supply interaction and production planning for short-life cycle products. M.S. dissertation, The University of Texas at El Paso, United States—Texas.*

Jimenez Hernandez, A.. Design for manufacturing systems from automotive industry perspective. M.S. dissertation, The University of Texas at El Paso, United States—Texas.*

Togar M Simatupang, & Ramaswami Sridharan. (2005). An integrative framework for supply chain collaboration. International Journal of Logistics Management, 16(2), 257-274.*

Zhenying Zhao, Michael O. Ball, & Masahiro Kotake. (2005). Optimization-Based Available-To-Promise with Multi-Stage Resource Availability. Annals of Operations Research, 135(1), 65-85.*

Senanayake, Muditha M. (2004). Mixed mass production and mass customization: Best practices for apparel. Ph.D. dissertation, North Carolina State University, United States.*

Fabrizio Salvador, Manus Rungtusanatham, Cipriano Forza, & Alessio Trentin. (2007). Mix flexibility and volume flexibility in a build-to-order environment :Synergies and trade-offs. International Journal of Operations & Production Management, 27(11), 1173-1191.*

* cited by examiner

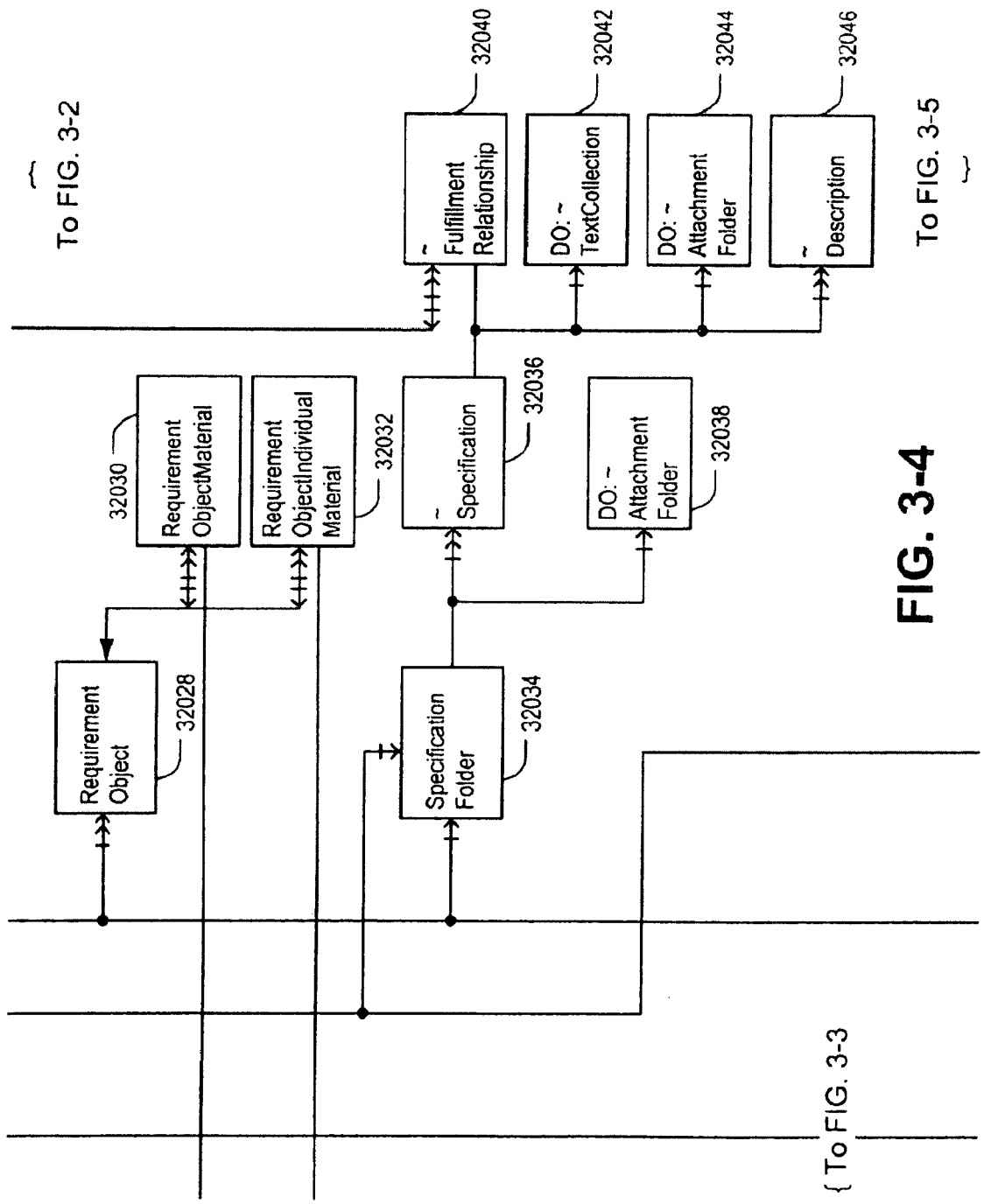

336

Sales Order: 40821

Status Open    Sold-to Firmware Corp    Description 12000378    Person Responsible John Doe    Total 23,595.30 USD

[Save] [Cancel] | [Preview] [Send] | [New] [Copy] [Delete] | [Submit] [Follow-Up] [Refresh]

Personalize Help

You Can Also...

General / Items / Pricing / Involved Parties / Document Flow / Changes / Attachments

Items

[Add Row] [Remove] [Refresh]

| Line | ATP | Product ID | Product Description | Options | Quantity | UoM | List Price | Discount | Line Price |
|------|-----|------------|---------------------|---------|----------|-----|------------|----------|------------|
| 10   | ☐   | F-0038     | AHT Window          | 476     | 12       | Pc  | 1,377.50   | 10%      | 14,877.00 USD |
| 20   | ☒   | F-0047     | AHT Radnr Flat 55.9 |         | 15       | Pc  | 840.00     | 10%      | 11,340.00 USD |

Details: Item AHT Window
To view the detailed results of the Available-to-Promise check, choose the Confirmation Schedules tab.

Details / Confirmation Schedules / Attachments / Product Options

| | | |
|---|---|---|
| Height of the window | 1200 | mm |
| Width of the window | 900.00 | mm |
| ⊞ Basic Features of the window | | |
| Model of the window | Compact Line | |
| Wooden window type | 101-01 Left | |
| Type of the wood | Pine | |
| Glass of the window | Lucent Ug 0.9 | |
| ⊞ Security add-ons | | |
| Security fittings | ☐ | |
| Alarm Contact | ☒ | |

Notes

Attachments:

[Upload]    [Browse...]

FIG. 4B

*Sales Order: 31751*

Status Open    Sold-to Mearcho Corp    External Reference    Person Responsible Jane Doe    Total 362.81 EUR    Help

[Save] [Save & Submit] [Send Option] [New▾] [Delete] [Follow-Up▾]    You Can Also▾

General / Items / Pricing / Involved Parties / Document Flow / Changes / Attachments

[Add Row] [Edit] [Remove] [Update Pricing] — 336

| Item | Description | Amount | Currency | For | UoM | Factor | Unit | Quantity | Price Comp Value |
|---|---|---|---|---|---|---|---|---|---|
| *10/ww_007 | Wooden Single Casement Window | | | | | | | 1 EA | |
| | Base price Size category W800/H1000 | 233.00 | EUR | 1 | EA | | | | 233.00 EUR |
| | Window model Alu line | 40 | % | 0 | | | | | 93.20 EUR |
| | Outside color Antico Green | 10 | % | 0 | | | | | 23.30 EUR |
| | Lucent glass Ug 0.9 | 53.00 | EUR/Unit | 0 | | 0.671 | sqm | | 35.56 EUR |
| | Alarm Contact | 84.00 | EUR | 1 | EA | | | | 84.00 EUR |
| | Profit margin | 35 | % | 0 | | | | | 164.17 EUR |

▣▣▣ Row [1] of 7 ◀▶

[Add Row] [Edit] [Remove]

| Description | Amount | Currency | For | UoM | Price Comp Value |
|---|---|---|---|---|---|
| Total Net Value | | | | | 304.89 EUR |
| Restocking Fee | 0 | EUR | 0 | | 0.00 EUR |
| Sales Tax | 0 | | 0 | | 57.92 EUR |
| Total | | | | | 362.81 EUR |
| Total Given Discounts | | | | | -164.17 EUR |

▣▣▣ Row [1] of 5 ◀▶

FIG. 4C

Properties and Default Values:

| | Width of the window | | Quantity | | | mm | ☑ Required | ▸ |
| | Height of the window | | Quantity | | | mm | ☑ Required | ▸ |

Property ID: Win_height
Decimal Places: 2
Unit of Measure: mm

Property Values: 600.00 - 2,000.00 mm
mm more...

You can add

Attachments:
[ Browse ... ]
[ Upload ]

Internal Notes:

| Output PRS | | Variant 1 | Variant 2 | Variant 3 |
|---|---|---|---|---|
| Input Product | Input PRS | Red 1kw | Red 2kw | Blue 1kw |
| Case | Red | X | X | |
| Case | Blue | | | X |
| Engine | 1kW | X | | X |
| Engine | 2kW | | X | |
| Power Supply | 1kW | X | | X |
| Power Supply | 2kW | | X | |
| Cable 5m | | X | X | X |

FIG. 7C

New Production BoM Variant

[Save] [Close]

General Details

BoM ID: AB_BOM_01  
BoM Variant ID: * GREEN  BoM Description:  
Product ID: MCA-0010  BoM Variant Description: ABHI1  
Product Specification ID: GREEN  Product Description:  
Quantity: 1 EA  Product Specification Description:

Engineering Change Order ID: ABECO01  [New]  
Engineering Change Order Description: test23

Input Products

[Add Row] [Delete Row] [Insert] [Rename] [Restructure]

| Line Item Group ID | Line Item ID | Product ID | Quantity | | Fixed | Engineering Change Order ID |
|---|---|---|---|---|---|---|
| ITGR01 | IT01 | MCA-0010-10 | 1 | EA ▸ | ☐ | ABECO01 |
| ITGR02 | IT01 | MCA-0010-20 | 2 | EA ▸ | ☐ | ABECO01 |
| ITGR03 | IT01 | MCA-0010-30 | 1 | EA ▸ | ☐ | ABECO01 |
| ITGR04 | IT01 | MCA-0010-40 | 3 | ACT ▸ | | |

336

Help

[View All]

MAKE-TO-SPECIFICATION PROCESS AND DATA MODEL

TECHNICAL FIELD

This disclosure relates to management and processing of orders and, more particularly, to systems, software, and computer implemented methods for providing or implementing a make-to-specification process and data model.

BACKGROUND

Currently, when a customer orders a product, goods are made to order or sold from the stock of the seller's company. Make-to-Order goods are when goods are produced for a customer after the customer has ordered them. In contrast, to when goods are Sell from Stock in which production is decoupled from sales via the stock. In the make-to-order scenario, material procurement covers material requirements originating from a single dedicated sales order. If the make-to-order process is used on a finished item level, then the procurement quantity is equal to the sales order quantity. The make-to-order scenario is frequently used if the product can be produced in different variants or configurations. In this case, the product may typically be procured or produced in exactly the configuration requested by the customer.

However, when goods are made to order, the customer will often have to wait for the components to be ordered and for the good to be made. The make-to-order process objective is to cover individual customer demands in time. However, the total lead time of a sales order across all production levels is often longer than acceptable for customers. When goods are sold from the stock of a seller's company, the customer may be limited (e.g., by the stock on hand) to which goods and/or which variants of the goods the customer may order.

SUMMARY

In one general aspect, master data may be maintained on a memory of a system and material requirements for the goods may be forecasted before sales orders are received. Sales orders may be received from a customer for at least one of the goods, and the sales order may include product options for ordered goods. A sales order confirmation and/or a plan for production of ordered goods may be generated, at least partially based on the sales order. The ordered goods may be produced based on the plan, and an outbound delivery request defined by the planning product requirement specification object of the system may be generated. The ordered goods may be delivered to the customer based on the generated outbound delivery request.

In another general aspect, a sales order may be received from a customer for goods. The sales order may include product requirements for ordered goods. A determination may be made regarding which of the product requirements will be satisfied in the production of the ordered goods based on the product requirements and a product requirement specification may be created using a product requirement specification business object of the system based on the sales order and the determination of which product requirements will be satisfied. A source of supply for the components of the ordered goods may be determined based on the product requirement specification and a plan for production of the ordered goods may be generated. The ordered goods may be produced based on the plan.

In another general aspect, a sales order may be received from a customer (or other requestor) for goods, where the sales order includes product options for the ordered goods. A determination may be made regarding whether a received sales order entails modification to a pre-existing product requirement specification business object based on the product options. The product requirement specification business object of a system may generate product requirement specifications based on received sales orders. A modified product requirement specification business object may be received and a product requirement specification may be generated based on the modified product requirement specification business object. A production planning order may be generated using a planning product requirement specification object of the system and based on the generated product requirement specification. The ordered goods may be produced based on the production planning order and an outbound delivery request may be generated based on the production planning order. The ordered goods may be delivered to the customer based on the delivery request.

Various implementations may include one, more, or none of the following features. Integration of required business functions, such as sales, planning, production, inventory management, delivery, and accounting, may be seamless. In one implementation, other scenarios like configure-to-order, engineer-to-order, and project manufacturing may be supported. As another example, implementations may support different industries such as automotive, high-tech, or apparel and footwear. Implementations may carry any kind of specification data (properties, drawings, etc.) throughout the logistics process chain and allow intervention. Various implementations may provide a system of product properties for the formal specification of product options. Various implementations may allow flexibility, easy usage of leftover inventory, process automation, automatic calculation of property-based prices, and/or integration into finance. Various implementations may allow preliminary order cost estimates and/or iStock valuation.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 3-1-3-5 illustrate an example ProductRequirementSpecification business object model (PRS BO) in accordance with one embodiment of the present disclosure;

FIG. 4B illustrates an example sales order template in accordance with one embodiment of the present disclosure;

FIG. 4C illustrates an example sales order with prices for components in accordance with one embodiment of the present disclosure;

FIG. 5 illustrates an example process for managing orders in accordance with environment 300 illustrated in FIG. 1;

FIG. 7B illustrates an example interface for receiving properties of a product requirement specification business object in accordance with the environment 300 illustrated in FIG. 1;

FIG. 7C illustrates an example variant listing for a product in accordance with the environment 300 illustrated in FIG. 1;

FIG. 7D illustrates an example production model in accordance with the environment 300 illustrated in FIG. 1; and FIG. 7E illustrates an interface for presentation of newly created production model and previously created production models in accordance with the environment 300 illustrated in FIG. 1.

DETAILED DESCRIPTION

Figure 1:
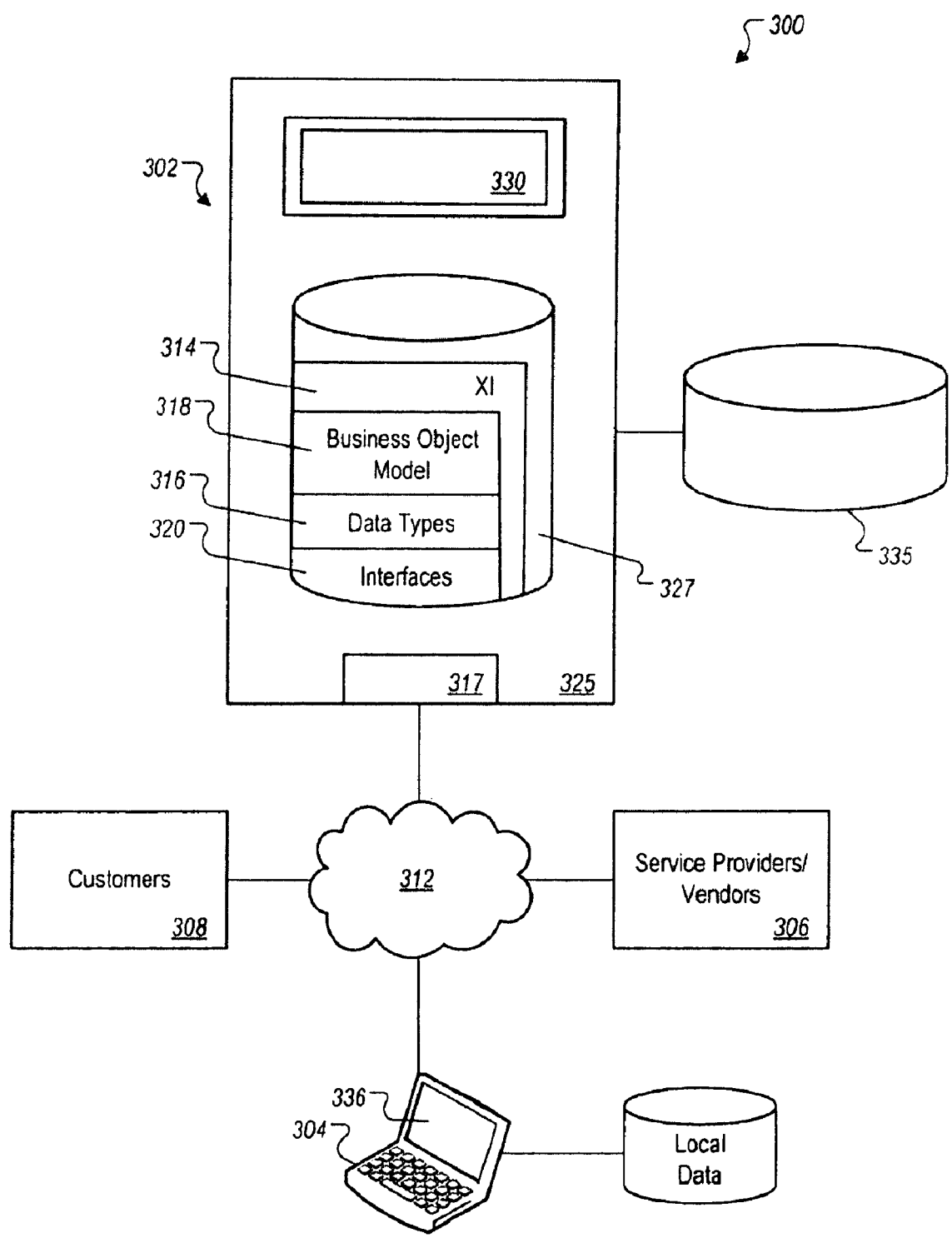
FIG. 1 illustrates an example system for managing orders in accordance with one embodiment of the present disclosure.

When customers desire a good, they may contact a company (e.g., via a website, through a sales agent, etc.) and order the good. The customer may desire a customized good with specified options and, thus, may communicate these options to the company. The company may then manage this order, in addition to other orders for similar or other goods, and ship the good to the customer, when available. The company may utilize an environment that includes a product requirement specification (PRS) business object that processes the necessary documents for the management of the orders received. The make-to-specification scenario may be used for products with options. Configurable products are an example of such products.

In a world of increasing individuality, the demand for individualized products is also increasing. Production companies in today's economic climate need to focus on agility, innovation, efficiency, transparency and visibility, and/or meeting customer requirements. Customers are increasingly putting pressure on midsized companies to move from a "push" to a demand-driven, flexible "pull" strategy so that goods ordered satisfy the customer's specific needs (e.g., components, costs, etc.). In the "push" system, products are designed, manufactured and then sold. In a "pull" system, the company sells the product before it is produced, based on customer-specific requirements. This shift changes the focus from managing inventory in anticipation of a sale, to effectively delivering products built on actual orders, and challenges companies to increase agility in order to better react and/or adapt to market and customer requirements.

To compete and be more responsive to customer requirements, companies are constantly challenged to improve process speed and flexibility. The companies tries to manage the complexities of commoditized and standardized products (i.e., the trend toward mass customization) and at the same time control and/or reduce costs in manufacturing and distribution. Increasing efficiency across supply chain activities facilitates these activities.

To accomplish this, some companies utilize visibility and transparency across the supply chain—from shop-floor to top-floor processes. When the information required to make critical business decisions is embedded across appropriate supply chain processes, many companies proactively sense and respond to new or changing demands.

In addition, establishing internal controls and processes can be a prerequisite for managing regulatory and legal compliance in today's complex global environment. Additionally, companies have to meet reporting requirements for industry standards to gain better control of processes and costs.

Methods and systems consistent with the subject matter described herein manage orders by generating various components from a business object model. Details regarding the creation of the business object model, the generation of an interface from the business object model, and the use of an interface generated from the business object model are provided below. For example, a PRS reference can be passed through the supply chain from the sales order item (MRP) through production/procurement planning order (Order release). The PRS reference can then be processed through production/purchase order (order confirmation) through Inventory. Production planning orders, procurement planning orders, production orders, purchase orders, inbound deliveries, and inventory each reference the PRS of the sales order item, which they are supposed to cover. Planning/MRP selects sales order items, production and procurement planning orders, production and purchase orders, and inventory of a material in a supply planning area with a PRS. Then it can compare the total demand quantity of all these objects with the total material receipt quantity and creates new production/procurement planning orders in case of a shortage. As such, the PRS reference can be passed through the supply chain and now planning/MRP compiles material receipts and requirements for a given material in a supply planning area with a PRS. Indeed, the make-to-specification process can also be applied to the purchasing process including purchase order creation, ordering, inbound delivery processing, and inventory management.

In some situations, a sales PRS may differ from a planning PRS. The sales agent or the customer create a sales PRS together with the sales order. This sales PRS is then translated into the planning PRS. Such translation may occur by a planner manually selecting a planning PRS, which he or she considers suitable to cover the requirement specified by the sales PRS. Some product options may be sales relevant, but not planning relevant. There fore, the product option can be marked as (not) planning relevant in the template PRS, which defines the product options and their possible values. Planning PRS instances can then be searched for automatically using the planning relevant product options of the sales PRS only. The customer may be indifferent with respect to some product options. A planning PRS can be selected (if it exists) by searching for PRS instances, where the properties specified in the sales PRS match. In planning material receipts and material requirements (i.e. the planning view of the sales order, or customer requirement, and the material receipt created to cover this demand) reference the planning PRS. Planning compiles material receipts and requirements for a given material in a supply planning area with a planning PRS to determine if there is a shortage for this and, if appropriate, creates a production or procurement planning order to cover this shortage. This can allow re-use of planning PRS and lot sizing. Moreover, one production or purchase order may be used to cover different sales orders (provided the sales orders are sufficiently similar), which can help save fixed order costs (set-up costs). This may also help reuse of inventory the product options of that are defined in a planning PRS, as well as potentially reduce product/process complexity. In other words, not every product option has to be known in production because such product options can be hidden in production.

An example of these situations is where a subset of all product options is production relevant. The customer can choose for example if he wants the product gift wrapped or not. The product is gift wrapped in the delivery process. Therefore this product option is not production relevant. Two customer requirements, which differ only in the gift-wrap option, may be covered by one single production planning order. This saves set-up and administrative costs. This additional degree of freedom can be utilized to reduce lead time. If the component required for one option is available earlier than the component required for the second option, then the first option shall be chosen. One special case of customer's indifference with respect to some of the product options is quality. Suppose that the option "quality" has the possible values "high", "medium", and "low." If the customer orders a low quality product, then he will be happy to get high or medium quality product for the same price instead. The customer actually is indifferent with respect to quality. If there is not enough low-quality material on stock to cover the customer requirement, then using existing high quality inventory may well be cheaper than procuring new low quality material. The process is often called down-binning or down-grading. On a component material level, the product options relevant for the component may be a subset of the product options of the finished material. Fixed order costs can be saved if the material for multiple component demands are procured together with one order. To this end, component demand with identical product options can be totaled. The potential for aggregation is much higher if only the product options relevant at component level are considered and not the product options relevant on finished item level. As such, component product options can be deduced from the finished item product options.

Turning to the illustrated embodiment in FIG. 1, environment 300 includes or is communicably coupled (such as via a one-, bi- or multi-directional link or network) with server 302, one or more clients 304, one or more or vendors 306, and one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 1 provides merely one example of computers that may be used with the disclosure. Each computer is generally intended to encompass any suitable processing device. For example, although FIG. 1 illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or offshore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and Java environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The data types 316 can be based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

The business object model 318 is used to derive consistent interfaces 320. XI 314 allows for the exchange of information from a first company having one computer system to a second company having a second computer system over network 312 by using the interfaces 320. The interfaces 320 may also facilitate the receipt of data from and/or presentation of data to clients 304 (e.g., on user display device 336).

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 1 illustrates a single processor 325 in server 302, multiple processors 325 may be used according to particular needs, and reference to processor 325 is meant to include multiple processors 325 where applicable. In the illustrated embodiment, processor 325 executes at least business application 330.

At a high level, business application 330 is any application, program, module, process, or other software that utilizes or facilitates the exchange of information via messages (or services) or the use of business objects. For example, application 330 may implement, utilize or otherwise leverage an enterprise service-oriented architecture (enterprise SOA), which may be considered a blueprint for an adaptable, flexible, and open IT architecture for developing service-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application. Regardless of the particular implementation, "software" may include any computer readable instructions embodied on tangible media such as executable code, firmware, wired or programmed hardware, or any combination thereof as appropriate. Indeed, the composite application may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that application may include various sub-modules, numerous other sub-modules, or may instead be a single multi-tasked module that implements the various features and functionality through various objects, methods, or other processes. Further, while illustrated as internal to server 302, one or more processes associated with the composite application may be stored, referenced, or executed remotely. For example, a portion of composite application may be a web service that is remotely called, while another portion of composite application may be an interface object bundled for processing at remote client 304. Moreover, composite application may be a child or sub-module of another software module or enterprise application (not illustrated) without departing from the scope of this disclosure. Indeed, composite application may be a hosted solution that allows multiple related or third parties in different portions of the process to perform the respective processing.

Computer 302 may also include communication interface 317 for communicating with other computer systems, such as clients 304, over network 312 in a client-server or other distributed environment. In certain embodiments, computer 302 receives data from internal or external senders through communication interface 317 for storage in memory 327, for storage in repository 335, and/or processing by processor 325. Generally, communication interface 317 comprises logic encoded in software and/or hardware in a suitable combination and operable to communicate with network 312. More specifically, communication interface 317 may comprise software supporting one or more communications protocols associated with communications network 312 or hardware operable to communicate physical signals.

In some implementations, server 302 by executing various business applications 330, XI 314, business object models 318, and interfaces 320 using processor 325 may perform various operations. For example, ordered goods may be managed using server 302. Master data may be stored on a memory of a system and maintained. Material requirements for the goods may be forecasted before sales orders are received and/or stored in various memories. Forecasting may include retrieving information from various memories (e.g., 335, 327) and/or from customers 308, and/or service providers 306. The processor may then analyze the retrieved data using one or more business objects 318. Sales orders, which include product requirements for ordered goods, may be received from a sales order requester through the communication interface 317. Such requesters may include customers, customer agents, or any other party that is requesting sales orders for themselves or others. Interfaces 320 generated by the server 302 may facilitate receipt of the sales orders. The received sales order may then be further processed by the processor 325 using various business objects 318 and/or business applications 330. A sales order confirmation and/or a plan for production of ordered goods may be generated at least partially based on the sales order. The ordered goods may then be produced based on the plan. An outbound delivery request may be generated, where ordered goods may be delivered to the customer based on the generated outbound delivery request.

In some implementations, the processor may utilize various business applications 330, XI 314, and/or business object models 318, to determine which of the product requirements in a sales order will be satisfied in the production of the ordered goods and a product requirement specification may be created (e.g., using a business object of the system) based on the sales order and the determination of which product requirements will be satisfied. The processor may retrieve various information (e.g., inventory, substitutable components, rankings of quality of various components, etc.) from memories 335, 327 coupled to the system to determine which of the product requirements to satisfy. A source of supply for the components of the ordered goods may be determined based on the product requirement specification and a plan for production of the ordered goods may be generated (e.g., at least partially based on the source of supply).

In some implementations, a determination may be made regarding whether a received sales order triggers modification to a pre-existing product requirement specification business object based on the product requirements. The product requirement specification business object of a system may generate product requirement specifications based on received sales orders. A modified product requirement specification business object may be received and a product requirement specification may be generated based on the modified product requirement specification business object.

A production planning order may be generated using a planning product requirement specification object of the system and based on the generated product requirement specification.

Figure 2:
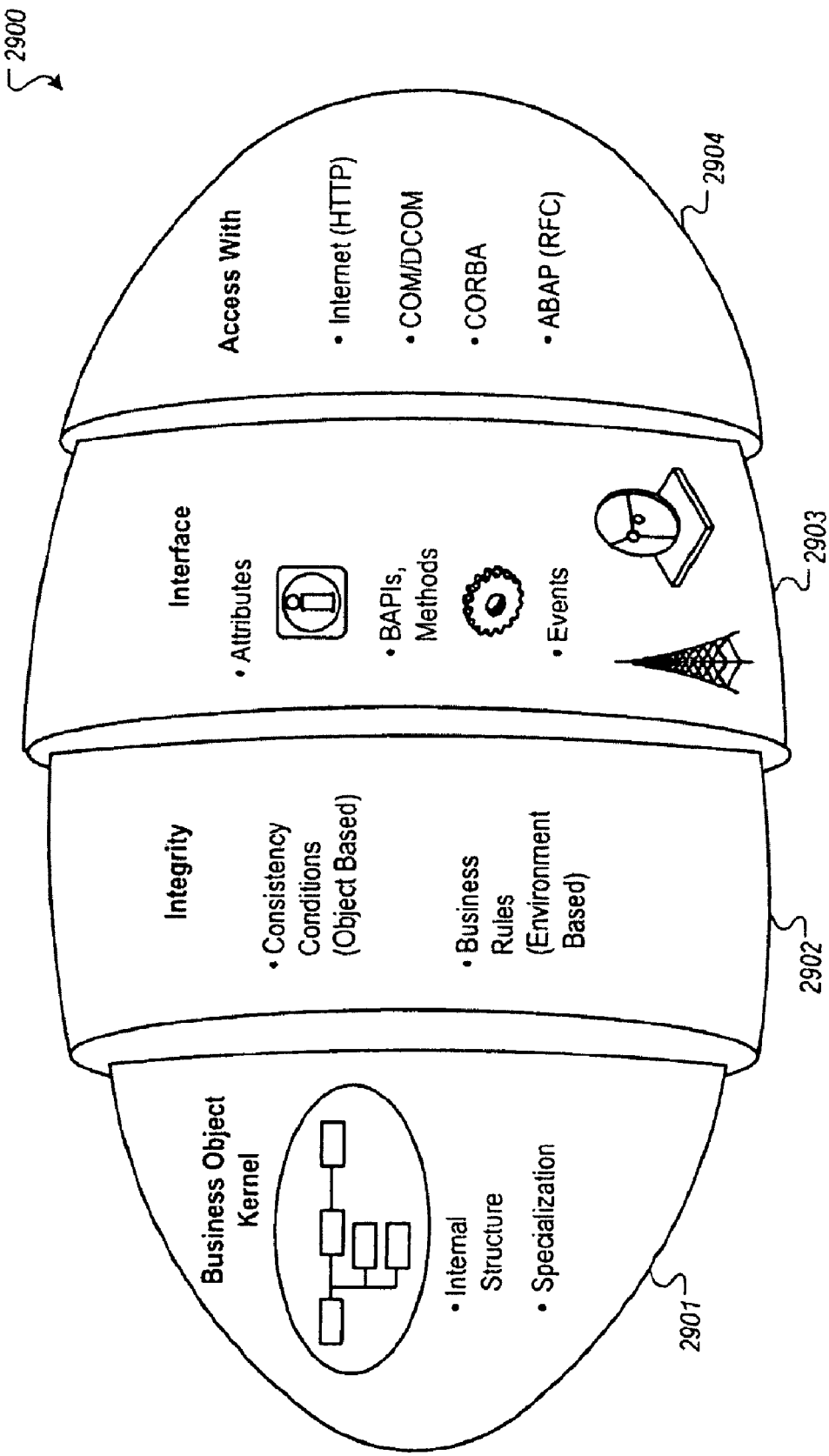
FIG. 2 illustrates an graphical representation of an example business object in accordance with one embodiment of the present disclosure.

FIG. 2 provides a graphical representation of one of the business objects 2900. As shown, an innermost layer, or kernel 2901, of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object.

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operations can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a "create," "update," or "delete" of a business object instance. Synchronous outbound process agents are generally triggered directly by a business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. The inbound process agent is not generally the agent of a business object but of its process component. The inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units, as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g., hourly, daily, every three months, etc.). Each customer may plan the services on demand or reschedule service execution upon request.

FIGS. 3-1 through 3-5, collectively, illustrate an example ProductRequirementSpecification business object model (PRS BO). At a high level, the PRS BO is an example business object (or, more specifically, a business object structure) that is collection of requirements for a product used in a specific business context (for example, in a prototype, development project, or sales order) and contains the corresponding specification for fulfilling these requirements. Put differently, it centrally captures customer individual specification information, including both agreed specification and internal information. In some configurations, the PRS BO is referenced from order item and can be available in steps of the make to specification process. The make-to-specification process can be software or application logic that implements a scenario to sell individualized materials to customers which are specified by the customer and are supplied after the sales order is received. The make-to-specification design can include portions of a Strategic Sourcing deployment unit, a Purchasing deployment unit, a Supplier Invoicing deployment unit, a Supply Chain Control deployment unit, a Production and Site Logistics Execution deployment unit, a Financials deployment unit, a Customer Invoicing deployment unit, a Customer Relationship Management deployment unit 182, and a Foundation deployment unit.

Production orders, production lots, and production tasks reference the production request, which may allow an indirect determination of the product requirement specification and, thus, reduce the need for the production order, the production lot, and the production task to reference the product requirement specification directly. The PRS BO may be a property of the input or output node of a production planning order and/or may not be a property of the production planning order root node.

The PRS BO may support the creation of a PRS instance through a service interface. When an identifier is not provided by a customer or other requestor, the system may include an identifier. In some implementations, the PRS instance may be saved in a memory of the system and/or changes may be inhibited. The PRS BO may allow content components on a root level, such as a language dependent description, an assignment of one product from the product master, and/or an assignment of a responsible employee from the employee master.

The product requirement specification generated by the PRS BO may include a language dependent specification text, a set of attachments, and/or a set of valuated properties. The PRS BO may allow the creation, addition, modification, and/or deletion of content of the product requirement specification.

The PRS BO may have a status on a root level with status values such as, 'in process,' 'released', and/or 'obsolete.' The PRS BO may allow status transitions from 'in process' to 'released' or 'obsolete,' from 'released' to 'obsolete,' and/or from 'obsolete' to 'released.' In some implementations, whether the PRS instance is modifiable and/or modifications are inhibited may depend on the status of the PRS. For example, the PRS instance may be modifiable when the PRS has an 'in process' status. As another example, modifications to the PRS instance may be inhibited when the PRS status is 'released.' Modifications may be inhibited on the PRS content on a root level and the specification content when the PRS has a status of 'released.'

The PRS instances may be retrievable by various properties, such as PRS identifier, PRS description, identifier of an assigned product (e.g., ordered good), description of an assigned product, responsible employee, status, and administrative data (e.g., created by, created at, last changed by, last changed at). For example, example, queries on PRS instances may selectively retrieve PRS instances with a status of 'obsolete' when the respective query parameter includes 'obsolete' PRS instances.

PRS BOs may be capable of being copied or reused. For example, at least a portion of the content of the source PRS instance may be copied to the target PRS instance. A status of the target PRS instance may be set by the copy to 'in process.'

Product requirement specifications may provide call back (e.g., MDCI (Master Data Creation Initiated)) to allow notification to planning about changes to product requirement specifications. In some implementations, the PRS may be a foundation layer object and direct notification may be inhibited.

The PRS may cause an error notification when deletion of a PRS instance is attempted and the PRS instance is referenced by other objects or nodes. In some implementations, a reference check (e.g., via MDCI) may be performed to determine if the PRS instance is referenced.

Turning to the figure, the illustrated business object RequirementSpecification_Template 32002 is a collection of requirements that exist for a business entity used in a particular business context, i.e., sales order, prototype, or development project. It also includes the specifications for fulfilling these requirements. The RequirementSpecification_Template 32002 can be used to help ensure the consistency and reusability of the business objects and occurs in an incomplete and disjoint projection ProductRequirementSpecification 32014.

A business entity is, for example, a material that represents a piece of machinery, a software application, or a service that can be priced, ordered, purchased, and maintained. It can also be a package that includes a plurality of other materials. The interaction of requirements and specifications is an agreement where the requirements reflect the outside-in point of view and the specifications focus on the details of feasibility. Typically, the feasibility information can be based on technical, legal, and logistical constraints. For example, a product window and window shutter requirements are the window dimensions, the control type (automatic or manual), or a specific surface finish. The specifications of these requirements define the properties, dimensions, legal aspects, allowed usage, and limitations. While the requirements are typically defined from an outside-in or sales perspective, they do not need to be precise, complete and consistent. Therefore, its specifications need to validate, document in detail, and fulfill the requirements. The specification helps ensure technical and operational feasibility.

The business object ProductRequirementSpecification 32014 is part of the foundation layer. A RequirementSpecification 32012 can be divided into requirements and their corresponding specifications. RequirementSpecification 32012 includes RequirementFolder 32016, SpecificationFolder 32034, RequirementObject 32028, SpecificationRequirementRelationship that connects requirements with their specification, and ProcessingInformationFolder 32048. The RequirementSpecification 32012 is represented by the root node, root.

The business object RequirementSpecification_Template 32002 can send or receive B2B messages. The business object RequirementSpecification_Template 32002 can send or receive A2A messages.

The RequirementSpecification (Root Node) 32012 business object is a collection of requirements that exist for a business entity used in a particular business context, i.e., sales order, prototype, or development project. It can also include the specifications for fulfilling these requirements. For the in-house processing chain there can also be processing information included that covers technical or logistical aspects.

Each instance of RequirementSpecification 32012 is a version and has its own VersionUUID. In certain situations, there is no additional UUID that is common for all versions. All instances that belong to the same subject of business share the same ID. Two instances of RequirementSpecification 32012 have different IDs if they are not versions of the same subject of business. They belong to independent subjects of business, like window shutters for two different buildings of different customers.

The RequirementSpecification 32012 can be divided into three main parts: RequirementFolder 32016, SpecificationFolder 32034, and ProcessingInformationFolder 32048. The first part is the RequirementFolder 32016. It can represent the collection of all requirements for a business entity, for example, a piece of machinery, a technical instrument, a software application, or a service within a given business context, i.e., a prototype, development project, or sales order. The second part is the corresponding SpecificationFolder 32034. It can cover all specifications to define the properties of the intended use and behavior of this business entity defined by the requirements. The third part is the collection of information relevant for in-house processing represented by the ProcessingInformationFolder 32048. The RequirementObject 32028 can specify the objects that are necessary to fulfill the RequirementSpecification 32012.

The elements located directly at the root node RequirementSpecification 32012 can be defined by the data type RequirementSpecificationElements. These elements include VersionUUID, ID, VersionID, SystemAdministrativeData, Name, LifeCycleStatusCode, RequirementSpecificationKey, Status, and LifeCycleStatusCode. VersionUUID can be a universally unique identifier of a Version of the RequirementSpecification 32012. Version UUID can be based on GDT: UUID. ID can be an identifier of the RequirementSpecification 32012 unique within one system and can be based on GDT: RequirementSpecificationID. VersionID can be an identifier of the version of the RequirementSpecification 32012. Version ID can be based on GDT: VersionID. SystemAdministrativeData can be administrative data, such as the person who last changed the version of RequirementSpecification 32012, or the time at which it was last changed. SystemAdministrativeData can be based on GDT: SystemAdministrativeData. Name can be a designation or title of the RequirementSpecification 32012. Name can be based on GDT:: _LANGUAGEINDEPENDENT_MEDIUM_Name, Qualifier RequirementSpecification. RequirementSpecificationKey can be a key structure of the RequirementSpecification 32012 that combines the ID of the RequirementSpecification 32012 with the corresponding VersionID. RequirementSpecificationKey can be based on IDT: RequirementSpecificationKey. RequirementSpecificationKey includes the elements ID and VersionID. ID can be based on GDT: RequirementSpecificationID. VersionID can be based on GDT: VersionID. Status can be the status of RequirementSpecification 32012 and can be based on IDT RequirementSpecificationStatus. Status may include the LifeCycleStatusCode element. LifeCycleStatusCode can be a description of the status of life cycle of the RequirementSpecification 32012. LifeCycleStatusCode can be based on GDT: RequirementSpecificationLifeCycleStatusCode.

The following composition relationships to subordinate nodes exist. From the RequirementSpecification 32012 node to a RequirementSpecificationDescription 32058 subordinate node, there exists a 1 to cn relationship. From the RequirementSpecification 32012 node to a RequirementSpecificationRelationship subordinate node, there exists a 1 to cn relationship. From the RequirementSpecification 32012 node to a RequirementFolder 32016 subordinate node, there exists a 1 to c relationship. From the RequirementSpecification 32012 node to a RequirementObject 32028 subordinate node, there exists a 1 to cn relationship. From the RequirementSpecification 32012 node to a SpecificationFolder 32034 subordinate node, there exists a 1 to c relationship. From the RequirementSpecification 32012 node to a ProcessingInformationFolder 32048 subordinate node, there exists a 1 to c relationship. From the RequirementSpecification 32012 node to a TextCollection (DO) 32060 subordinate node, there exists a 1 to c relationship. From the RequirementSpecification 32012 node to a AttachmentFolder (DO) 32062 subordinate node, there exists a 1 to c relationship.

Integrity for SystemAdministrativeData can be set internally and automatic. Integrity can occur for the Enterprise Service Infrastructure Actions StartEvaluationPhase, ResumeCreation, Release, and FlagAsObsolete.

The S&AM Action StartEvaluationPhase can enable a check for the completeness and fulfillment of the RequirementSpecification. In some implementations, therefore, no changes to requirements or specifications are possible. In this phase, the status value changes from "Creation In Process" to "Evaluation In Process." In some implementations, if RequirementFolder 32016 and/or SpecificationFolder 32034 includes its own processing status, these status variables have the value "Finished." If requirements have their own status, these status values are "Finished." The S&AM Action ResumeCreation allows changes to the Requirement Specification in order to complete and refine missing information. In this phase, the status value changes from "Evaluation In Process" to "Creation In Process." In the S&AM Action Release phase, a released requirement specification can reflect a fixed and consistent content, which is usable in any consuming process. In this phase, the status value changes from "Creation In Process" or "Evaluation In Process" to the status value "Released." With the released status, the maintenance process of the RequirementSpecification 32012 is completed and finished regarding the requirements, specifications, and the fulfillment of the requirements. In some implementations, this action requires the same preconditions as action "Finish." In addition, all requirements which have a SolutionProposal status is in status "Solution Accepted." In some implementations, in the S&AM Action FlagAsObsolete phase, an obsolete requirement specification signals that its content is no longer valid and should normally not be used in any process. A reason for an obsolete requirement specification can be the occurrence of new requirements with major impact or the creation of a new version of the requirement specification. The status value changes from any other status value to the status value "Obsolete." In some implementations, after this action, the Requirement Specification is typically not changed or used by further objects or processes.

Queries can include a QueryByKey, a QueryByElements, and a SelectAll. QueryByKey can deliver a list of RequirementSpecifications 32012 for given ID and VersionID combinations. The query elements can be defined by the data type RequirementSpecificationIDQueryElements. These elements include UUID and IDT: RequirementSpecificationKey. UUID can be of type GDT: UUID. IDT: RequirementSpecificationKey includes the elements ID and Version ID. ID can be of type GDT: RequirementSpecificationID, and VersionID can be of type GDT: VersionID. QueryByElements can deliver a list of for given elements. It can deliver a list of RequirementSpecifications 32012, which if queried by parameters, exist in the UI of the RequirementSpecifications 32012. The query elements can be defined by the data type RequirementSpecificationElementsQueryElements. These elements include UUID, ID, VersionID, SystemAdministrativeData, CreationBusinessPartnerCommonPersonNameGivenName, CreationBusinessPartnerCommonPersonNameFamilyName, LastChangeBusinessPartnerCommonPersonNameGivenName, LastChangeBusinessPartnerCommonPersonNameFamilyName, Name, Status, RequirementFolderResponsibleEmployeeUUID, RequirementFolderResponsibleEmployeeID, RequirementFolderResponsibleGivenName, RequirementFolderResponsibleFamilyName, RequirementID, RequirementName, RequirementCreationProcessingStatusCode, RequirementSolutionProposalStatusCode, MaterialUUID, MaterialID, IndividualMaterialUUID, and IndividualMaterialID. UUID can be based on GDT: UUID. ID can be based on GDT: RequirementSpecificationID. VersionID can be based on GDT: VersionID. SystemAdministrativeData can be based on GDT: SystemAdministrativeData. CreationBusinessPartnerCommonPersonNameGivenName can be based on GDT: Name, Qualifier: LANGUAGEINDEPENDENT_MEDIUM_Name. CreationBusinessPartnerCommonPersonNameFamilyName can be based on GDT: Name, Qualifier: LANGUAGEINDEPENDENT_MEDIUM_Name. LastChangeBusinessPartnerCommonPersonNameGivenName can be based on GDT: Name, Qualifier: LANGUAGEINDEPENDENT_MEDIUM_Name. LastChangeBusinessPartnerCommonPersonNameFamilyName can be based on GDT: Name, Qualifier: LANGUAGEINDEPENDENT_MEDIUM_Name. Name can be based on GDT: _LANGUAGEINDEPENDENT_MEDIUM_Name, Qualifier RequirementSpecification. Status can be based on IDT: RequirementSpecificationStatus. RequirementFolderResponsibleEmployeeUUID can be based on GDT: UUID.

RequirementFolderResponsibleEmployeeID can be based on GDT: EmployeeID. RequirementFolderResponsibleGivenName can be based on GDT: Name, Qualifier: LANGUAGEINDEPENDENT_MEDIUM_Name. RequirementFolderResponsibleFamilyName can be based on GDT: Name, Qualifier: LANGUAGEINDEPENDENT_MEDIUM_Name. RequirementID can be based on GDT: RequirementSpecificationRequirementFolderRequirementID. RequirementName can be based on GDT:: _LANGUAGEINDEPENDENT_MEDIUM_Name, Qualifier RequirementSpecificationRequirementFolderRequirement.

RequirementCreationProcessingStatusCode can be based on GDT: ProcessingStatusCode. RequirementSolutionProposalStatusCode can be based on GDT SolutionProposalStatusCode. MaterialUUID can be based on GDT: UUID. MaterialID can be based on GDT: ProductID. IndividualMaterialUUID can be based on GDT: UUID. IndividualMaterialID can be based on GDT: ProductID. SelectAll selects all entries.

The RequirementSpecificationDescription 32058 is a representation of the properties of RequirementSpecification 32012 in natural language. The elements located at the description node can be defined by the data type RequirementSpecificationDescriptionElements. This includes the description element. RequirementSpecificationDescription 32058 can be a short description of RequirementSpecification 32012. RequirementSpecificationDescription 32058 can be based on GDT: _MEDIUM_DESCRIPTION, Qualifier: RequirementSpecification.

A RequirementSpecificationRelationship can represent a relationship of two instances of RequirementSpecification 32012 to define that a common context exists. If a complex business entity deliverable is requested, several instances of RequirementSpecification 32012 are reasonable to distinguish different areas of requirements. Nevertheless, they can be linked to each other to express a common context. An example for a common context is the relationship between RequirementSpecification 32012 in a customer quotation and another RequirementSpecification 32012 in a subsequent sales order.

The elements located at the node RequirementSpecificationRelationship can be defined by the data type RequirementSpecificationRealtionshipElements. These elements include: UUID, VersionUUID, and RequirementSpecificationKey. UUID can be a universally unique identifier of a relationship of the RequirementSpecification 32012. UUID can be based on GDT: UUID. VersionUUID can be a universally unique identifier of an associated version of RequirementSpecification 32012. Version UUID can be based on GDT: UUID. RequirementSpecificationKey can be a key structure of the RequirementSpecification 32012 that is used to associate another RequirementSpecification based on human readable RequirementSpecificationID and the corresponding VersionID. RequirementSpecificationKey can be based on IDT: RequirementSpecificationKey. RequirementSpecificationKey includes the elements RequirementSpecificationID and RequirementSpecificationVersionID. RequirementSpecificationID can be based on GDT: RequirementSpecificationID. RequirementSpecificationVersionID can be based on GDT: VersionID.

From the business object RequirementSpecification 32012 to RequirementSpecificationRelationship there is a 1 to cn relationship. In some implementations, only association relationships within the same projections are possible. At least the UUID of the RequirementSpecification 32012 or the RequirementSpecificationKey are provided to build a relationship between two instances of RequirementSpecification.

RequirementFolder 32016 can be a collection of all requirements needed for a business entity. It includes the central information that is relevant for all subsequent single requirements. The RequirementFolder 32016 is introduced to separate assigned Requirements from Specifications and Processing Information. It is therefore a common anchor for all assigned Requirements.

The elements located at the node RequirementFolder 32016 can be defined by the data type RequirementSpecificationFolderElements. These elements include UUID, ResponsibleEmployeeUUID, ResponsibleEmployeeID, Status, and SystemAdministrativeData. UUID can be a universally unique identifier of a RequirementFolder and can be based on GDT: UUID. ResponsibleEmployeeUUID can be a universally unique identifier of the employee who is responsible for the RequirementFolder 32016. ResponsibleEmployeeUUID can be based on GDT: UUID. ResponsibleEmployeeID can be a unique identification of the employee who is responsible for the RequirementFolder. ResponsibleEmployeeID can be based on GDT: EmployeeID. Status can represent the status of RequirementFolder 32016. It can be based on IDT: RequirementSpecificationRequirementFolderStatus. Status includes the CreationProcessingStatusCode, BlockingStatusCode, LifeCycleStatusCode, and RequirementSpecificationLifeCycleStatusCode. CreationProcessingStatusCode relates to the creation of RequirementFolder 32016 content and can be based on GDT: ProcessingStatusCode. BlockingStatusCode relates to the blocking of RequirementFolder content. BlockingStatusCode can be based on GDT: BlockingStatusCode. LifeCycleStatusCode relates to the lifecycle of RequirementFolder 32016 and can be based on GDT: RequirementSpecificationRequirementFolderLifeCycleStatusCode. RequirementSpecificationLifeCycleStatusCode is derived from the lifecycle of root RequirementSpecification 32012. RequirementSpecificationLifeCycleStatusCode can be based on GDT: RequirementSpecificationLifeCycleStatusCode. SystemAdministrativeData can represent administrative data, such as the person who last changed the RequirementFolder 32016 and the time at which it was last changed. SystemAdministrativeData can be based on GDT: SystemAdministrativeData.

The following composition relationships to subordinate nodes exist. From the RequirementFolder 32016 node to the RequirementFolderRequirement 32018 subordinate node, there exists a 1 to cn relationship. From the RequirementFolder 32016 node to the RequirementFolderAttachmentFolder (DO) 32020 subordinate node, there exists a 1 to c relationship. From the business object Employee to the node root Employee there exists a 1 to c relationship. Employee indicates the employee who is responsible for the RequirementFolder 32016.

The Enterprise Service Infrastructure Actions includes a StartEvaluationPhase, a ResumeCreation, a Block, and an Unblock. The S&AM Action StartEvaluationPhase phase of the Requirement Folder 32016 reflects that all requirements are defined and its content is completed to be reviewed and evaluated. In this phase, the status value changes from "In Process" to the status value "Finished." In some implementations, it is not possible to create new, change respectively, and/or delete existing requirements. If requirements have their own status, these status values are "Finished." The S&AM Action ResumeCreation action enables the ability to continue to maintain, refine, and complete the work on the content of requirements. New requirements can be added and invalid requirements can be deleted. In this phase, the status value changes from "Finished" to the status value "In Process." After the status value is set on "In Process," it is possible to maintain requirements. The S&AM Action Block can create a blocked status that signals that due to further clarification, no requirements shall be maintained, created, or deleted. In this action, the status value changes from "Not Blocked" to "Blocked." In some implementations, besides any maintenance of requirements, actions on the Lifecycle status for single requirements are not possible at this state. The S&AM Action Unblock action can create an unblocked status that signals that requirements are enabled to be maintained, created, or deleted. In this action, the status value changes from "Blocked" to "Not Blocked."

RequirementFolderRequirement 32018 can represent a natural language or property-based description of direct needs and expectations relevant for a planned or existing business entity, for example, a piece of machinery, a technical instrument, a tool or a software application.

In contrast to a specification, the requirements do not need to be precise or complete and detailed, but they typically include the essential properties. Typical qualifiers include: good, regular, not relevant, easy, or stable. For example, a window shutter handling requirement can include the following options: "manual handling, handling from inside with less expenditure of energy."

The elements located at the node RequirementSpecificationRequirementFolderRequirement 32018 can be defined by the data type RequirementSpecificationRequirementFolderRequirementElements. These elements include UUID, ID, Name, RequirementPriorityCode, Status, and SystemAdministrativeData. UUID can be a universally unique identifier of a requirement within the RequirementFolder 32016 of the RequirementSpecification 32012. UUID can be based on GDT: UUID. ID can be an identifier of a requirement unique within the RequirementSpecification 32012. ID can be based on GDT: RequirementSpecificationRequirementFolderRequirementID. Name can be a designation or title of a Requirement within a RequirementSpecification. Name can be based on GDT: _LANGUAGEINDEPENDENT_MEDIUM_Name, Qualifier RequirementSpecificationRequirementFolderRequirement. RequirementPriorityCode can be a coded representation of the importance of a requirement within the RequirementSpecification 32012. It can be ordered in a sequence which allows the processing based on the relevance of a Requirement. RequirementPriorityCode can be based on GDT: PriorityCode. Status can represent the status of RequirementFolderRequirement 32018. Status can be based on IDT: RequirementSpecificationRequirementFolderRequirementStatus. Status includes the CreationProcessingStatusCode, SolutionProposalStatusCode, RequirementFolderBlockingStatusCode, and RequirementFolderLifeCycleStatusCode elements. CreationProcessingStatusCode relates to the creation of Requirement content and can be based on GDT: ProcessingStatusCode. SolutionProposalStatusCode relates to the solution proposal of Requirement and can be based on GDT: SolutionProposalStatusCode. RequirementFolderBlockingStatusCode is derived from the blocking status of the RequirementFolder 32016 and can be based on GDT: BlockingStatusCode. RequirementFolderLifeCycleStatusCode is derived from the lifecycle status of the RequirementFolder 32016 and can be based on GDT: RequirementSpecificationRequirementFolderLifeCycleStatusCode. SystemAdministrativeData can represent administrative data, such as the person who last changed the Requirement and the time at which it was last changed. SystemAdministrativeData can be based on GDT: SystemAdministrativeData.

The following composition relationships to subordinate nodes exist. From the RequirementFolderRequirement 32018 node to a RequirementFolderRequirementDescription 32026 subordinate node, there exists a 1 to cn relationship. From the RequirementFolderRequirement 32018 node to a RequirementFolderRequirementTextCollection (DO) 32022 subordinate node, there exists a 1 to c relationship. From the RequirementFolderRequirement 32018 node to a RequirementFolderRequirementAttachmentFolder (DO) 32024 subordinate node, there exists a 1 to c relationship.

The Enterprise Service Infrastructure Actions includes a FinishCreation, a ResumeCreation, a ProposeSolution, a ReviseSolution, an AcceptSolution, and a RejectSolution action. In some implementations, the S&AM Action FinishCreation of the requirement and its content is completed and shall be closed. In this action, the status value changes from "In Process" to "Finished." In some implementations, it may not be possible to further change the TextCollection or AttachmentFolder. The S&AM Action ResumeCreation action allows maintenance, refinement, and completion the work on the content of requirements. New requirements can be added and invalid requirements can be deleted. In this action, the status value changes from "Finished" to "In Process." After the status value is set on "In Process" it is possible to change the requirement in order to add missing information or more precise content. Additionally, the SolutionProposal status can be set to the value "No Solution Proposed." In the S&AM Action ProposeSolution action, a requirement of the status "solution proposed" reflects that its fulfillment can be reviewed and should be consistent. In this action, the status value changes from any value to the status value "SolutionProposed." In some implementations, neither content nor assignments can be changed. Therefore, a judgment whether the requirement is met can be assigned. In the S&AM Action ReviseSolution action, a requirement of the status "no solution proposed" reflects that its fulfillment is not accepted and therefore needs to be corrected or detailed to be consistent. In this action, the status value changes from any value to the status value "No Solution Proposed." After the action "Revise Solution" is executed, it is allowed to change specification assignments. In the S&AM Action AcceptSolution action, a requirement of the status "Solution Accepted" reflects that its fulfillment is consistent, complete, and accepted, and the requirement is met. In the action, the status value changes from "Solution Proposed" or "Solution Rejected" to the status value "Solution Accepted." In the S&AM Action RejectSolution action, a requirement of the status "Solution Rejected" reflects that the fulfillment of the requirement is inconsistent or incomplete and therefore was rejected, and the requirement is not met. In this action, the status value changes from "Solution Proposed" or "Solution Accepted" to the status value "Solution Rejected."RequirementFolderRequirementDescription 32026 can be a representation of the properties of the RequirementFolderRequirement 32018 in natural language. The elements located at the description node can be defined by the data type RequirementSpecificationRequirementFolderRequirementDescriptionElements. This includes the Description element. Description can represent a short description of a RequirementSpecificationRequirementFolderRequirement. Description can be based on GDT: _MEDIUM_DESCRIPTION, Qualifier: RequirementSpecificationRequirementFolderRequirement.

RequirementFolderRequirementTextCollection (DO) 32022 can represent a natural-language text describing the RequirementFolderRequirement 32018. RequirementFolderRequirementAttachmentFolder (DO) 32022 can represent an electronic document of any type, whose content is related to the RequirementFolderRequirement 32018 under examination. RequirementFolderAttachmentFolder (DO) 32024 can represent an electronic document of any type, whose content is related to the RequirementFolder 32016 under examination.

RequirementObject 32028 is a business object that is requested to fulfill the requirements. The basic information can be the type of the required business object, which can be, for example, a material. Furthermore, RequirementObject 32028 can also include administrative information. RequirementObject 32028 occurs in the disjoint and incomplete specializations, RequirementObjectMaterial 32030 and RequirementObjectIndividualMaterial 32032. The specializations can specify the business object connected to the RequirementSpecification 32012. In the environment, the specialization can be represented by a "1 to c" composition for the specialization nodes.

In some implementations, the RequirementObject 32028 occurs only once in the specialization of a RequirementObjectMaterial 32030 and only once in the specialization of the RequirementObjectIndividualMaterial 32032 in maximum. For each specialization, at least a Material 32066 or Individual Material 32068 or Product Category assignment exist.

RequirementObjectMaterial 32030 can represent a material that can fulfill the RequirementSpecification 32012. In addition, RequirementObjectMaterial 32030 can include identifying information. RequirementObjectMaterial 32030 includes the elements UUID, ID, and SystemAdministrativeData. UUID can be a universally unique identifier of a requested Material to which the RequirementSpecification 32012 refers. UUID can be based on GDT: UUID. ID can be an identifier of a requested material to which the RequirementSpecification 32012 refers. ID can be based on GDT: ProductID. SystemAdministrativeData can represent administrative data, such as the person who last changed the reference to the RequirementMaterial 32012 and the time at which it was last changed. SystemAdministrativeData can be based on GDT: SystemAdministrativeData.

From the business object Product 32070 to the node Material 32066, there exists a c to cn relationship. Material 32066 can specify the material that is requested in the RequirementSpecification 32012.

RequirementObjectIndividualMaterial 32032 can represent an individual material that can fulfill the RequirementSpecification 32012. In addition, the RequirementObjectIndividualMaterial 32032 can include identifying information. RequirementObjectIndividualMaterial 32032 includes the elements UUID, ID, and SystemAdministrativeData. UUID can be a universally unique identifier of an IndividualMaterial to which the RequirementSpecification 32012 refers. UUID can be based on GDT: UUID. ID can be an identifier of a requested IndividualMaterial, to which the RequirementSpecification 32012 refers. ID can be based on GDT: ProductID. SystemAdministrativeData can represent administrative data, such as the person who last changed the reference to a RequirementMaterial and the time at which it was last changed. SystemAdministrativeData can be based on GDT: SystemAdministrativeData.

From the business object Product 32070 to the node IndividualMaterial 32068, there exists a c to cn relationship. IndividualMaterial 32068 can specify the IndividualMaterial that is requested in the RequirementSpecification 32012.

SpecificationFolder 32034 can be a collection of all specifications that can define the fulfillment of the requirements of a business entity. It can cover the information that is relevant for all subsequent single specifications. The SpecificationFolder 32034 can be introduced to separate the assigned specifications against requirements and processing information. In some implementations, it is therefore a common anchor for all assigned specifications.

The elements located at the node SpecificationFolder 32034 can be defined by the data type RequirementSpecificationSpecificationFolderElements. These elements include the UUID, ResponsibleEmployeeUUID, ResponsibleEmployeeID, Status, and SystemAdministrativeData elements. UUID can be a universally unique identifier of the SpecificationFolder 32034. UUID can be based on GDT: UUID. ResponsibleEmployeeUUID can be a universally unique identifier of the employee who is responsible for the SpecificationFolder. ResponsibleEmployeeUUID can be based on GDT: UUID. ResponsibleEmployeeID can be a unique identification of the employee who is responsible for the SpecificationFolder. ResponsibleEmployeeID can be based on GDT: EmployeeID. Status can represent the status of SpecificationFolder 32034. Status can be based on IDT RequirementSpecificationSpecificationFolderStatus. Status includes the CreationProcessingStatusCode, BlockingStatusCode, LifeCycleStatusCode, and RequirementSpecificationLifeCycleStatusCode elements. CreationProcessingStatusCode relates to the creation of SpecificationFolder 32034 content and can be based on GDT: ProcessingStatusCode. BlockingStatusCode relates to the blocking status of SpecificationFolder 32034 and can be based on GDT: BlockingStatusCode. LifeCycleStatusCode relates to the lifecycle of SpecificationFolder 32034 and can be based on GDT: RequirementSpecification-SpecificationFolderLifeCycleStatusCode. RequirementSpecificationLifeCycleStatusCode is derived from the lifecycle status of root RequirementSpecification 32012. RequirementSpecificationLifeCycleStatusCode can be based on GDT: RequirementSpecificationLifeCycleStatusCode. SystemAdministrativeData can represent administrative data, such as the person who last changed the SpecificationFolder 32034 and the time at which it was last changed. SystemAdministrativeData can be based on GDT: SystemAdministrativeData.

The following composition relationships to subordinate nodes exist. From the SpecificationFolder 32034 node to the SpecificationFolderSpecification 32036 subordinate node, there exists a 1 to cn relationship. From the SpecificationFolder 32034 node to the SpecificationFolderAttachmentFolder (DO) 32038 subordinate node, there exists a 1 to c relationship.

From the business object Employee 30010 to the node Root there exists a 1 to c relationship. Employee 30010 can indicate the employee who is responsible for the SpecificationFolder.

The Enterprise Service Infrastructure Actions includes a FinishCreation, a ResumeCreation, a Block, and an Unblock action. In the S&AM Action FinishCreation action, the definition of all specifications and its content is completed and will be closed. In this action, the status value changes from "In Process" to the status value "Finished." In some implementations in the "Finished" status, it may not be possible to create new, change, or respectively delete existing specifications. In order to change the status value to "Finished," the CreationProcessing status variables of the business object node SpecificationFolderSpecification 32036 have the value "Finished." The S&AM Action ResumeCreation action allows continuance of maintenance, refinement, and completion the work on the content of the specification. New specifications can be added and invalid specifications can be deleted. In this action, the status value changes from "Finished" to the status value "In Process." After the status value is set on "In Process," it will be possible to maintain specifications in order to add missing information or more precise content in detail. In some implementations in the S&AM Action Block action, the blocked status signals that, due to further clarification, no specifications shall be maintained, created, or deleted. In this action, the status value changes from "Not Blocked" to "Blocked." In some implementations, it will not be possible to create new specifications or delete existing specifications. Changes on existing specifications or actions on the Processing status for single specifications are not possible at this state. In the S&AM Action Unblock action, the unblocked status signals that specifications are enabled to be maintained, created, or deleted. In this action, the status value changes from "Blocked" to "Not Blocked."

The SpecificationFolderSpecification 32036 (detail concept, feasibility concept) can be a precise definition of one or many features and the way they fulfill one or many requirements of the business entity.

In contrast to a requirement, the content of a specification may be precise, complete and quantifiable or measurable. It combines technical, legal, or other constraints. These constraints can define the usage, behavior, and maintenance of the delivered business entity with the focus on the requirements. It can also include warnings in case of abuse. In some implementations, the specification is not a design or implementation and therefore does not contain the design. The specifications for the handling of a window shutter may be: manual handles, such as by belt, crank or lever, or electrically, such as with a switch (e.g., on an opposing side as a manual handle). Four possible handling mechanisms will fulfill the task to operate the shutter functionality.

The elements located at the node RequirementSpecificationSpecificationFolderSpecification 32036 can be defined by the data type RequirementSpecification-SpecificationFolderSpecificationElements. These elements include UUID, ID, Name, and Status. UUID can be a universally unique identifier of a specification within the RequirementSpecification 32012. UUID can be based on GDT: UUID. ID can be an identifier of a specification unique within the RequirementSpecification 32012. ID can be based on GDT: RequirementSpecification-SpecificationFolderSpecificationID. Name can be a designation or title of a specification within a RequirementSpecification. Name can be based on GDT: _LANGUAGEINDEPENDENT_MEDIUM_Name, Qualifier RequirementSpecificationSpecificationFolderSpecification. Status can represent the status of SpecificationFolderSpecification 32036. Status can be based on IDT: RequirementSpecificationSpecificationtFolderSpecificationStatus. Status includes the CreationProcessingStatusCode, SpecificationFolderBlockingStatusCode, and SpecificationFolderLifeCycleStatusCode elements. CreationProcessingStatusCode relates to the creation of Specification content and can be based on GDT: ProcessingStatusCode. SpecificationFolderBlockingStatusCode is derived from the blocking status of SpecificationFolder and can be based on GDT: BlockingStatusCode. SpecificationFolderLifeCycleStatusCode is derived from the lifecycle status of SpecificationFolder and can be based on GDT: RequirementSpecification-SpecificationFolderLifeCycleStatusCode. SystemAdministrativeData can represent administrative data, such as the person who last changed the specification and the time at which it was last changed. SystemAdministrativeData can be based on GDT: SystemAdministrativeData.

The following composition relationships to subordinate nodes exist. From the SpecificationFolderSpecification 32036 node to a SpecificationFolderSpecificationDescription 32046 subordinate node, there exists a 1 to cn relationship. From the SpecificationFolderSpecification 32036 node to a SpecificationFolderSpecificationFulfillmentRelationship 32040 subordinate node, there exists a 1 to cn relationship. From the SpecificationFolderSpecification 32036 node to a SpecificationFolderSpecificationTextCollection (DO) 32042 subordinate node, there exists a 1 to c relationship. From the SpecificationFolderSpecification 32036 node to a SpecificationFolderSpecificationAttachmentFolder (DO) 32044 subordinate node, there exists a 1 to c relationship.

The Enterprise Service Infrastructure Actions includes a FinishCreation and a ResumeCreation. In the S&AM Action FinishCreation action, the definition of the specification and its content is completed and can be closed. In this action, the status value changes from "In Process" to "Finished." In some implementations in this action, it is not possible to change the TextCollection or AttachmentFolder further. The S&AM Action ResumeCreation action can enable the continuation of the maintenance of the specifications. New specifications can be added and invalid specifications can be corrected or deleted. In this action, the status value changes from "Finished" to "In Process." After the status value is set on "In Process," it will be possible to change the specifications. In addition, the SolutionProposal status of all assigned requirements will be set to the initial value.

SpecificationFolderSpecificationDescription 32046 can be a representation of the properties of the SpecificationFolderSpecification 32036 in natural language. The elements located at the description node can be defined by the data type RequirementSpecification-SpecificationFolderSpecificationDescriptionElements. This includes the Description element. Description can be a short description of a RequirementSpecification-SpecificationFolderSpecification. Description can be based on GDT: _MEDIUM_DESCRIPTION, Qualifier: RequirementSpecificationSpecificationFolderSpecification.

SpecificationFolderSpecificationTextCollection (DO) 32022 can represent a natural-language text describing the SpecificationFolderSpecification 32036. SpecificationFolderSpecificationAttachmentFolder (DO) 32024 can represent an electronic document of any type, whose content is related to the SpecificationFolderSpecification 32036 under examination. SpecificationFolderSpecificationFulfilmentRelationship 32040 can be a relationship of a specification that contributes to the fulfillment of one or multiple requirements.

During the creation process of specifications, it is important to assign such a specification to one or many requirements even if a specification is not yet released and the fulfillment of the requirements is not approved. This allows a determination as to whether specifications are already in process in the early stages. In some cases, if no specification is required for requirements, then these requirements are marked as self-specified by a corresponding status value. For a window shutter, the requirement "manual handling, handling from inside with less expenditure of energy," can be fulfilled by multiple solutions, handling by belt, crank, or lever. With the assignment of a specification to the requirement it will be documented as to how the requirement will be fulfilled, such as "handling by crank."

The elements located at the node SpecificationFolderSpecificationFulfimentRelationship 32040 can be defined by the data type RequirementSpecificationSpecificationFolder-SpecificationFulfimentRelationshipElements. These elements include SpecificationFolderSpecificationUUID, RequirementFolderRequirementUUID, and SystemAdministrativeData. SpecificationFolderSpecificationUUID can be a universally unique identifier of the SpecificationFolderSpecification 32036 to which one or many requirements can be assigned. Because specifications can be defined to address issues caused by requirements, this relationship belongs to the SpecificationFolderSpecification 32036. Therefore, in some implementations, it can only be maintained on the level of SpecificationFolderSpecifications. SpecificationFolderSpecificationUUID can be based on GDT: UUID. RequirementFolderRequirementUUID can be a universally unique identifier of an associated requirement of the RequirementFolder 32016 to which the SpecificationFolderSpecification 32036 refers. RequirementFolderRequirementUUID can be based on GDT: UUID. SystemAdministrativeData can represent administrative data, such as the person who last changed the SpecificationFolderSpecificationFulfilmentRelationship and the time at which it was last changed. SystemAdministrativeData can be based on GDT: SystemAdministrativeData.

SpecificationFolderAttachmentFolder (DO) 32038 can represent an electronic document of any type, whose content is related to the SpecificationFolder 32034 under examination.

ProcessingInformationFolder 32048 is a collection of information that can be relevant for the subsequent processing of the business entity in terms of, for example, production, storage, and transportation.

In contrast to the content of the SpecificationFolderSpecification 32036, the enclosed information is intended primarily for a manufacturer's internal use. This content is strongly related to the entire value chain that is to provide the business entity. In some implementations, therefore this information should be hidden and considered as not relevant for an external customer. For example, for a window shutter, the dimensions of the shutter may primarily influence the later production process. For requirement purposes, the window size or the measured size of the shell of a building will be the determining factor of information.

The elements located at the node ProcessingInformationFolder 32048 can be defined by the data type RequirementSpecificationProcessingInformationFolderElements. These elements include UUID, ResponsibleEmployeeUUID, ResponsibleEmployeeID, Status, and SystemAdministrativeData. UUID can be a universally unique identifier of the ProcessingInformationFolder 32048. UUID can be based on GDT: UUID. ResponsibleEmployeeUUID can be a universally unique identifier of the employee who is responsible for the ProcessingInformationFolder 32048. ResponsibleEmployeeUUID can be based on GDT: UUID. ResponsibleEmployeeID can be a unique identification of the employee who is responsible for the ProcessingInformationFolder 32048. ResponsibleEmployeeID can be based on GDT: EmployeeID. Status can represent the status of ProcessingInformationFolder 32048. Status can be based on IDT: RequirementSpecification ProcessingInformationFolderStatus. Status includes the CreationProcessingStatusCode. CreationProcessingStatusCode relates to the creation of Specification content and can be based on GDT: ProcessingStatusCode. SystemAdministrativeData can represent administrative data, such as the person who last changed the ProcessingInformationFolder 32048 and the time at which it was last changed.

The following composition relationships to subordinate nodes exist. From the ProcessingInformationFolder 32048 node to a ProcessingInformationFolderProcessingInformation 32050 subordinate node, there exists a 1 to cn relationship. From the ProcessingInformationFolder 32048 node to a ProcessingInformationFolderAttachmentFolder (DO) 32064 subordinate node, there exists a 1 to c relationship.

Figures 1, 3:
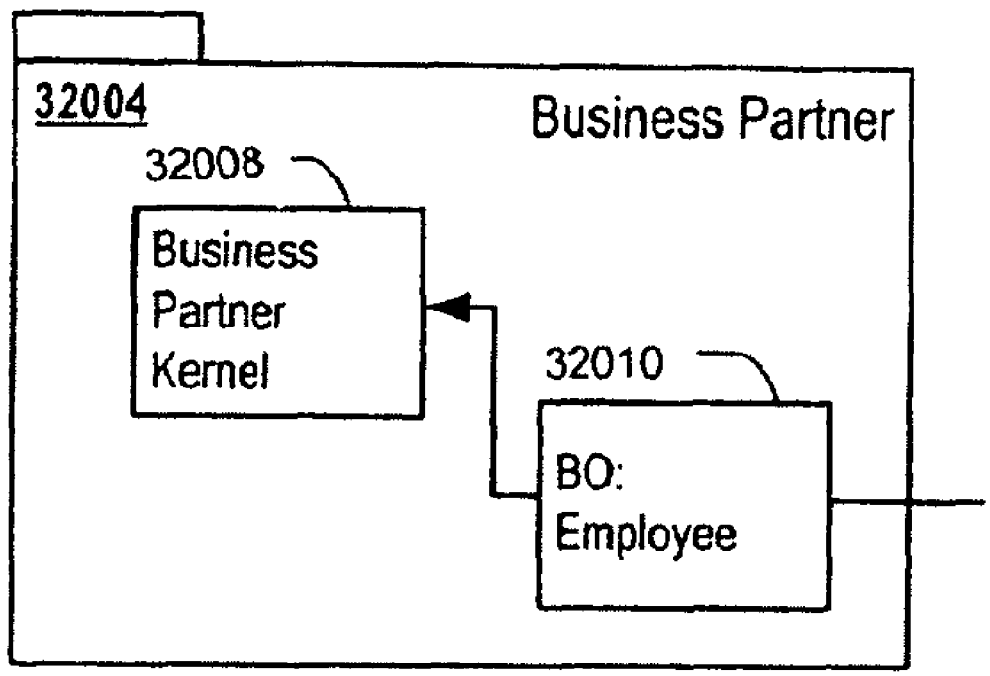
Figures 2, 3:
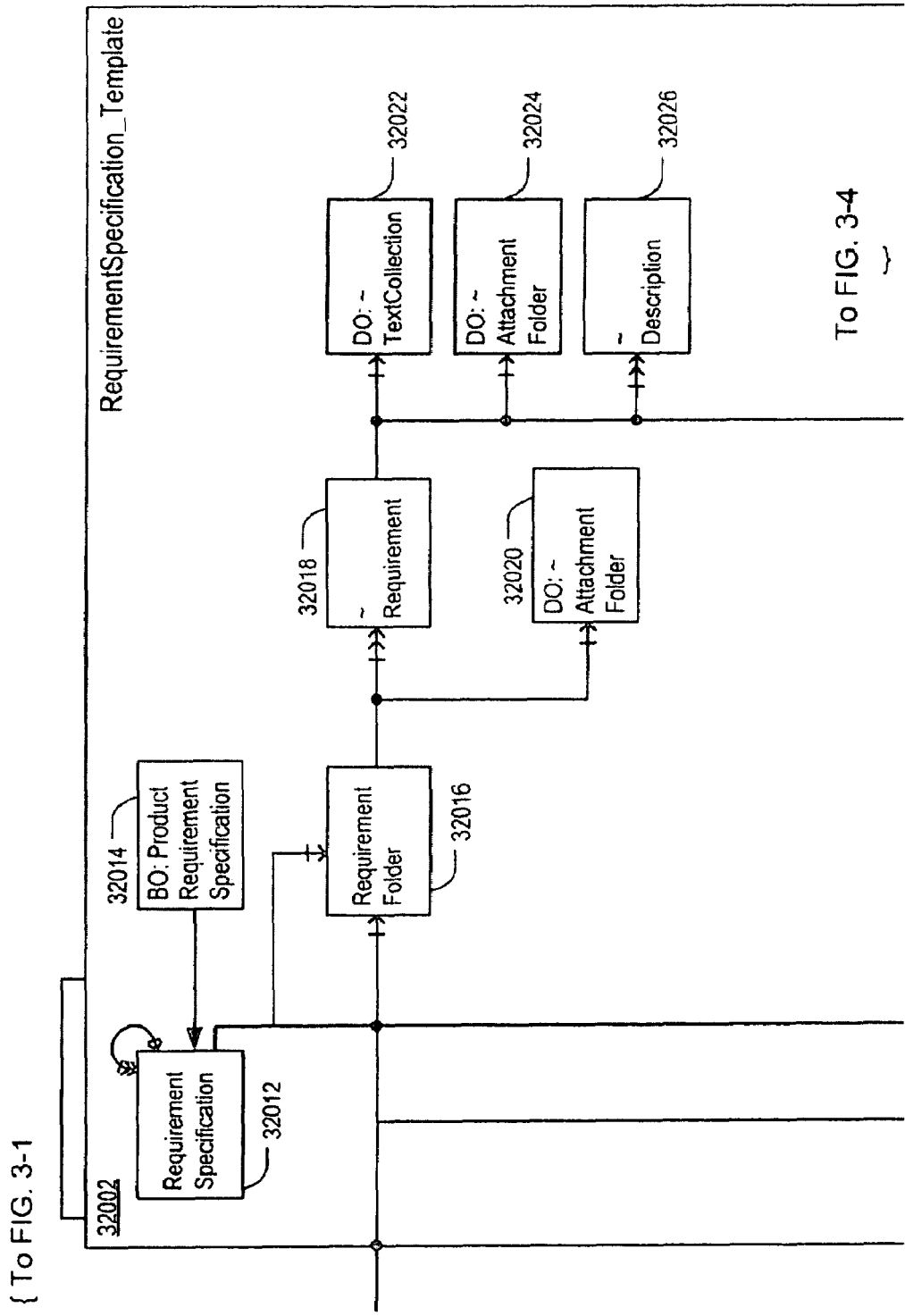
Figure 3:
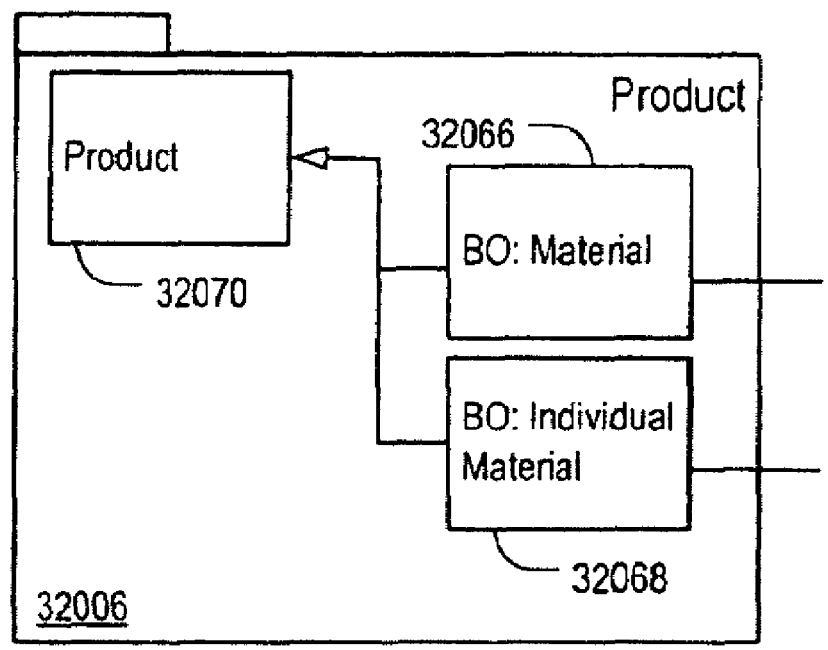

In the Business Partner package 32004 shown in FIG. 3-1, from the business object Employee 32010 to the node Root RequirementSpecification 32012, there exists a 1 to c relationship. Employee 32010 can indicate the employee who is responsible for the ProcessingInformationFolder.

The Enterprise Service Infrastructure Actions includes a FinishCreation action and a ResumeCreation action. In the S&AM Action FinishCreation action, the definition of the processing information is completed and can be closed. In this action, the status value changes from "In Process" to "Finished." In some implementations, it is not possible to add, change, or delete processing information at this time. The S&AM Action ResumeCreation action enables the continuation of the maintenance of the processing information. In this action, the status value changes from "Finished" to "In Process."

ProcessingInformationFolderProcessingInformation 32050 can represent any definition, information or instruction that is important for an optimized in-house processing, i.e., in terms of production, packaging, or storage. This set of information is intended for in-house processing, but not limited to it. In the case of collaboration between manufacturers, they may want to share this information because they share the value chain of the business entity. It can be outlined that the stakeholder of the requested business entity does not need to know this information and is typically not allowed to know it. For example, the concrete size of the window shutter (width 108 cm, 55 fins) is important for further processing steps but not relevant for the published specification of a requirement in general.

The elements located at the node RequirementSpecificationProcessingInformationFolderProcessingInformation 32050 can be defined by the data type RequirementSpecificationProcessingInformationFolderProcessingInformationElements. These elements include the UUID, ID, Name, and SystemAdministrativeData elements. UUID can be a universally unique identifier of the ProcessingInformation within the ProcessingInformationFolder 32048 of the RequirementSpecification 32012. UUID can be based on GDT: UUID. ID can be an identifier of the ProcessingInformation unique within the RequirementSpecification 32012 and can be based on GDT: RequirementSpecificationProcessingInformationFolderProcessingInformationID. Name can be a designation or title of a specification within the RequirementSpecification 32012. Name can be based on GDT: _LANGUAGEINDEPENDENT_MEDIUM_Name, Qualifier RequirementSpecificationProcessingInformationFolderProcessingInformation. SystemAdministrativeData can represent administrative data, such as the person who last changed the ProcessingInformation and the time at which it was last changed. SystemAdministrativeData can be based on GDT: SystemAdministrativeData.

The following composition relationships to subordinate nodes exist. From the ProcessingInformationFolderProcessingInformation 32050 node to a ProcessingInformationFolderProcessingInformationDescription 32056 subordinate node, there exists a 1 to cn relationship. From the ProcessingInformationFolderProcessingInformation 32050 node to a ProcessingInformationFolderProcessingInformationTextCollection (DO) 32052 subordinate node, there exists a 1 to c relationship. From the ProcessingInformationFolderProcessingInformation 32050 node to a ProcessingInformationFolderProcessingInformationAttachmentFolder (DO) 32054 subordinate node, there exists a 1 to c relationship.

ProcessingInformationFolderProcessingInformationDescription 32056 is a representation of the properties of ProcessingInformationFolderProcessingInformation 32050 in natural language. The elements located at the description node can be defined by the data type RequirementSpecificationProcessingInformationFolderProcessingInformationDescriptionElements. The ProcessingInformationFolderProcessingInformationDescription includes the Description element. Description can be a short description of a RequirementSpecification ProcessingInformationFolderProcessingInformation. Description can be based on GDT: _MEDIUM_DESCRIPTION, Qualifier: RequirementSpecification ProcessingInformationFolderProcessingInformation.

ProcessingInformationFolderProcessingInformationTextCollection (DO) 32052 can represent a natural-language text describing the ProcessingInformationFolderProcessingInformation 32050. ProcessingInformationFolderProcessingInformationAttachmentFolder (DO) 32054 can represent an electronic document of any type, the content of which is related to the ProcessingInformationFolderProcessingInformation 32050 under examination. ProcessingInformationFolderAttachmentFolder (DO) 32064 can represent an electronic document of any type, the content of which is related to the ProcessingInformationFolder 32048 under examination.

TextCollection (DO) 32060 can be a natural-language text describing RequirementSpecfciation_Template 32002. AttachmentFolder (DO) 32062 can be an electronic document of any type, whose content is related to the RequirementSpecification 32002 under examination.

The derivation of the business object template RequirementSpecification 32012 has been implemented as the business object ProductRequirementSpecification 32014.

The following table shows which example nodes are available for these derivations.

| Node | Business Object ProductRequirementSpecification |
| --- | --- |
| RequirementFolder | X |
| RequirementFolder Requirement | X |
| RequirementObject | X |
| SpecificationFolder- SpecificationFolderSpecification | X |
| ProcessingInformationFolder | X |
| ProcessingInformationFolder ProcessingInformation | X |
| All Description Nodes | X |
| All TextCollection Nodes | X |
| All AttachmentFolder Nodes | X |

ProductRequirementSpecification 32014 is a collection of requirements that exist for a product used in a particular business context, i.e., sales order, prototype, or development project. It can also include the specifications for fulfilling these requirements. For the in-house processing chain, there is also processing information included that covers technical or logistical aspects. The business object ProductRequirementSpecification 32014 can be part of the Foundation Layer.

The definition and the behavior of a version is an Integration topic across several BOs. Therefore, changes to definitions concerning the declaration of a version may be a subject of change in order to achieve a cross BO alignment of version behavior. For example, ID and VersionID can be declared as regular data type.

Referring to FIGS. 3-1 through 3-5, the RequirementSpecification_Template business object model 32002 depicts interactions among various components of the RequirementSpecification_Template, as well as external components that interact with the RequirementSpecification_Template (shown here as 32002 and 32004). The RequirementSpecification_Template business object model 32002 includes elements 32012 through 32064. The elements 32012 through 32064 can be hierarchical, as depicted. For example, the RequirementSpecification_Template 32002 hierarchically includes RequirementSpecification 32012, RequirementFolder 32016, and Description 32058.

Figure 4A:
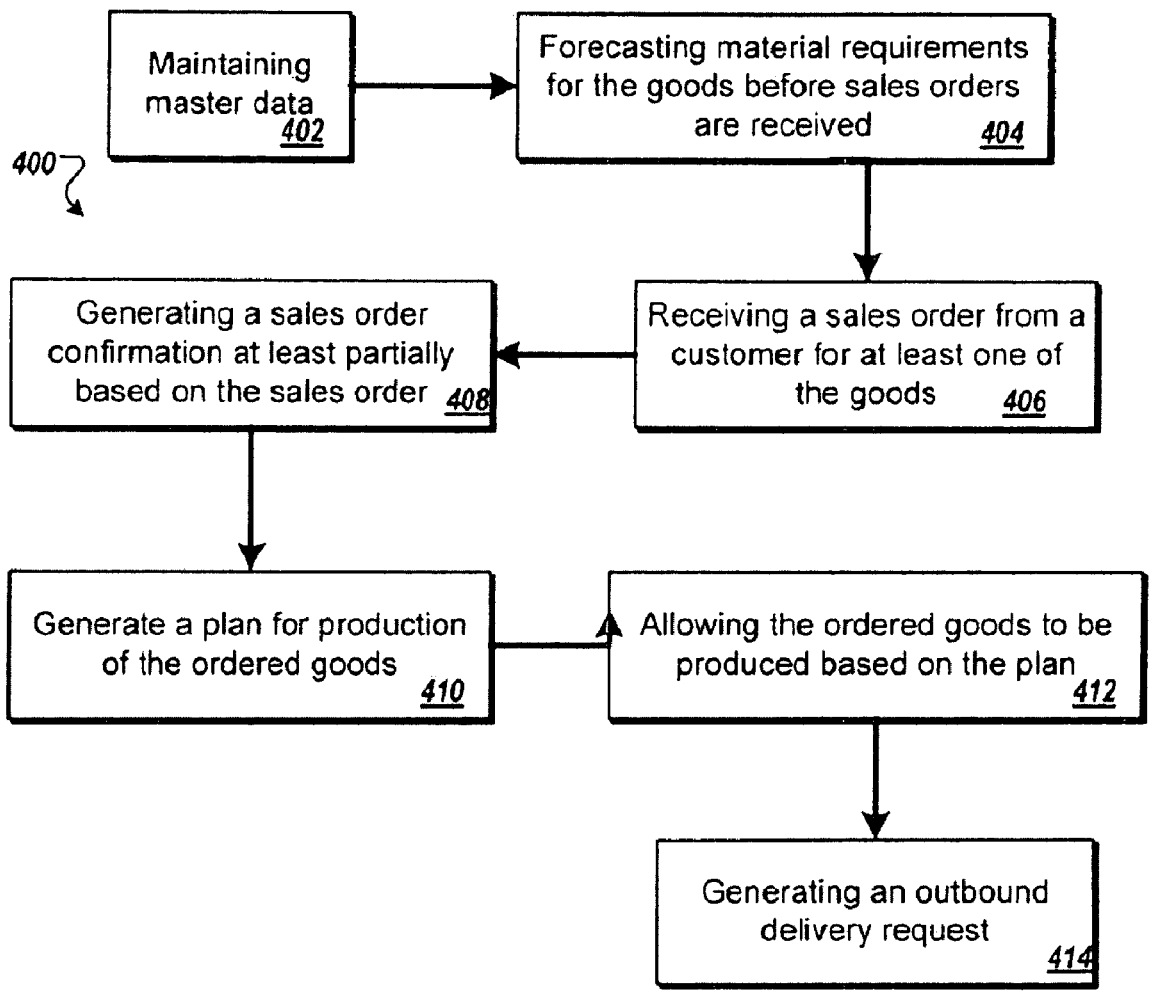
FIG. 4A illustrates an example process for managing orders in accordance with environment 300 illustrated in FIG. 1.
Figure 5:
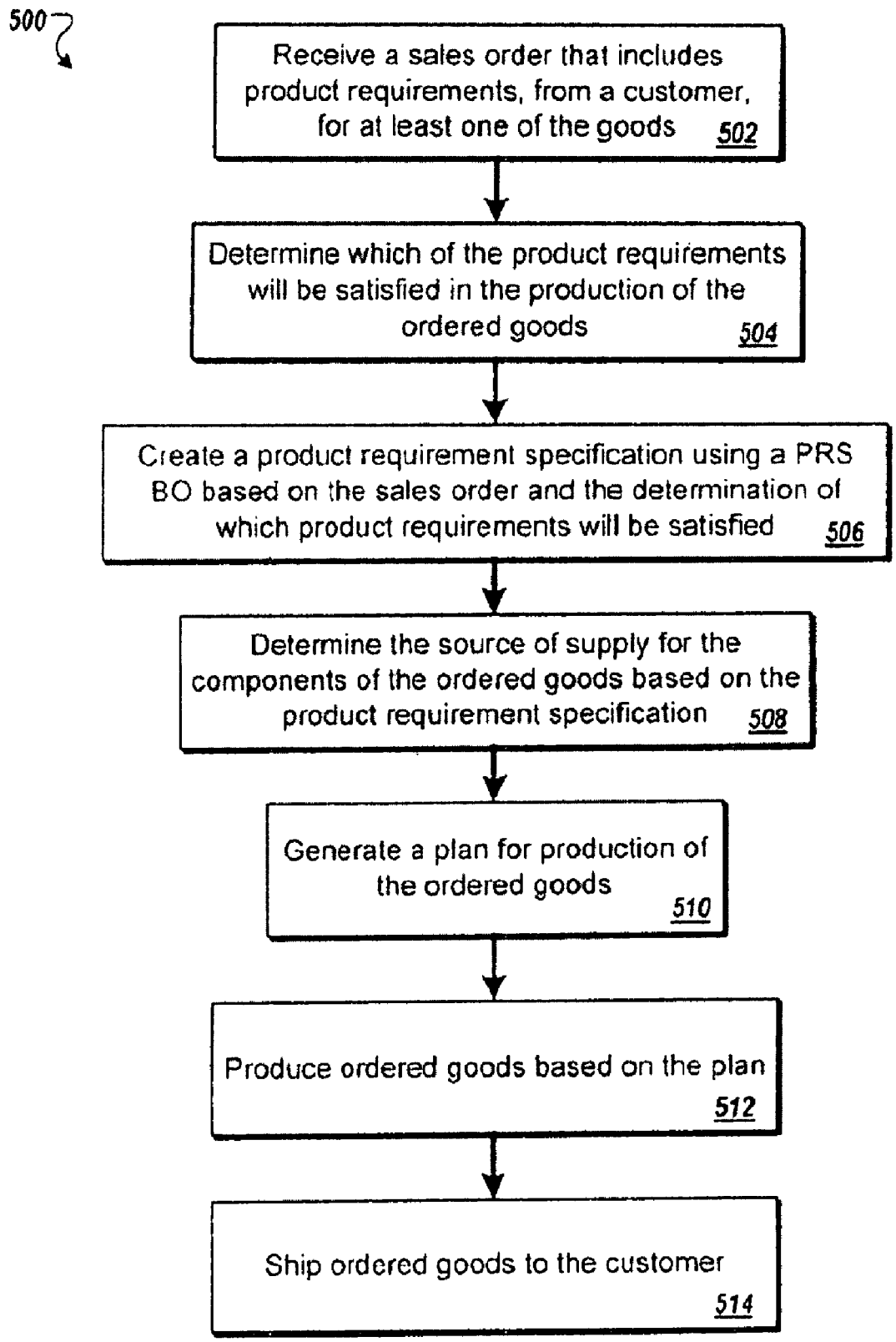

FIG. 4A illustrates a method of managing orders according to which the environment 300 and business objects may operate. At step 402, master data may be maintained on a system. For example, master data may be stored on a memory coupled to server 302. Processor 325 may execute various applications and business object to maintain the master data. Master data describes the possible product options. Master data creation includes the creation of a product requirement specification template, which defines the options of a product. The processor may update stored master data based on changes to possible product options (e.g., new options, deletion of options, etc.) and/or based on creation of new product requirement specification templates. The options may be described by means of properties. To facilitate the exchange of property-based data between customer and supplier, the properties may be based on a common standard, such as the eCl@ss Classification and Product Description System, available at www.eclass.eu. If a customer and a supplier agree on a standard, then it can be downloaded, for example, from the standard's organization and stored in a memory of the system. The server may then generate an interface including the standards for presentation to the customer to facilitate receipt of sales orders.

The system may store a Product Property Library. The product property library may include a set of property definitions, which can be used to describe products. In some implementations, it is a singleton, i.e., only one instance of the business object product property library exists in the system. This instance could be downloaded from a standard's organization.

The system may also include a material root node that has the property iStock-type. An iStock is a subset of a material that shares a set of common characteristics. For example, the iStock can be logistically handled separately from other subsets of the same material and is uniquely identified. To this end, a label with the iStock-ID is attached to the piece of inventory or iStock is put into a separate storage bin for the warehousing system to keep track on where which iStock is located. Material, which satisfies the requirements specified in a PRS, is managed by iStock. The iStock is created before or during the goods receipt of the material. This could be the time when the label is printed. The iStock references the PRS, which describes the product options of the inventory. Turning to the iStock-type, the iStock-type "mandatory specified stock" or "optional specified stock" may be a prerequisite for the make-to-specification process. iStock-type initial, batch, or lot is used for standard products, which may not be customized, in some implementations. Typical examples are screws, nuts and bolts, consumer packaged goods, etc.

iStock-type "optional specified stock" is used for standard products, which can, in some cases, be customized. iStock-type "mandatory specified stock" is used for products that may not be produced without a product requirement specification because each product instance may be different. Examples are cars, PCs, windows, etc. In some implementations, when mandatory specified stock exists, iStock may be a requirement, rather than or in addition to PRS (production requirement specification).

At step 404, material requirements may be forecasted for the goods before sales orders are received. For example, the business object in environment 300 may forecast the material requirements based on estimating expected component demand, components (e.g., attributes such as type), finished item level, and/or total demand for several finished items. Since a total lead time of a sales order across all production levels is often longer than acceptable for customers, forecasting may decrease wait times for customers and/or increase customer satisfaction. Thus, material may be procured in advance and withdrawn from stock when needed. The present make-to-specification scenario supports sales and procurement of products with options. The options required by the customer are known only after sales order entry. If the product allows many different options, then it may not be feasible to stock the finished product. It could, however, be possible to procure components in advance, which do not have options, but which drive the total lead time. Thus, the expected component demand may be estimated before sales orders are received. This estimate could be based on a demand forecast.

Material demand can be forecasted on one or more different levels:
- Component/Assembly level
- Finished item level
- Total demand of several finished items can be forecasted on product group level Combining the different levels of material provisioning with the different forecast levels, one or more of the following options exist to forecast demand for products with options:
- Forecast make-to-stock demand only
- Forecast, procure, and stock preconfigured variant on finished item level
- Forecast, procure, and stock components without options
- Forecast demand on finished item level, procure and stock common components
- Forecast demand on finished item level, procure, and stock components (also the components, which are optional on finished item level) based on an estimate how optional component demand is distributed.
- If a standard variant of the product exists, which is made to stock and if the product is also produced to customer specification, then it is also possible to just forecast the standard variant's demand. Procurement of the standard variant can be done based on the forecast. Customer-specific parts are procured only after sales orders are received.

In some implementations, demand forecasting may be performed. In this case, demand planning creates its forecast based on, for example, a history of the make-to-stock demand. Planned independent requirements are released when the demand forecast is released. The planned independent requirements only represent the make-to-stock demand. MRP (Material Requirement Planning) can be used to create production or procurement planning orders covering the planned independent requirements. Production or purchasing can be requested, for example, immediately for these production or procurement planning orders. It may not be necessary to wait until sales orders are received.

Sales orders requesting a special product option are a demand on top of a forecast. MRP creates additional production or procurement planning orders if a sales order requesting special product options is received. Historic sales orders requesting a special product option are not considered in forecasting.

In some implementations, forecasting material demand may be based on the number and variability of materials on every production level. If the set of possible product variants is small and predefined, then the product variants can be forecasted directly. In this case, engineering and sales may agree on a set of predefined product requirement specifications, which define the product in more detail. Every predefined product requirement specification describes a product variant. For example, a producer of T-shirts sells and produces grey and black T-shirts of sizes S, M, L, and XL. This can be supported by predefining product requirement specifications for grey T-shirts size S, black T-shirts size S, grey T-shirts size M, and black T-shirts size M, etc.

In some implementations, each variant can be forecasted individually and the demand forecast and the planned independent requirement may specify product requirement specification of the product variant. Supply planning then uses the forecast to procure the product with the given PRS to stock. A sales order entered at a later point of time can be covered with the material on stock to minimize lead time, which may increase customer satisfaction and/or reduce costs (e.g., since production time is decreased).

If a finished item has many options, then forecasting the sales order configurations may be more complex. However, if a few components drive lead time and they do not have options, then these critical components may be forecasted and/or the other components may not be forecasted (e.g., planning on assembly level).

In some implementations, certain components may be required for special options of a finished product. Components may be forecasted for sales orders requiring these special options, and thus, a planner may not be required to anticipate the combination of different options the customer may select in a finished product. For example, a product may have "color" and "power" options, where the red case is required for red products, and the blue case is required for blue products. A forecast may be generated for finished product special options by estimating the demand for red products and not estimating the type of engines selected, for example.

Material demand may be forecasted at the material provisioning level, in some implementations. A planned independent requirement may be created from the demand forecast. Supply planning triggers procurement of the components in order to cover the planned independent requirement. In some implementations where components without options are forecasted and components with options are not forecasted, it may not be necessary to introduce the product requirement specification in demand planning and forecast consumption.

Forecasting may be performed based on Finished Item Level and/or with a Forecasting Bill of materials (BOM). If the finished products share the majority of components, then the need to create forecasts for every component may outweigh the advantages of forecasting on component level, in some implementations, and forecasting may be performed based on other factors, such as forecasting demand on finished item level and using BOM explosion to create the component demand. When the required product options are not yet known and some components may depend on the product options BOM, explosion may be performed in one or more of the following ways:

BOM explosion determines components that do not depend on any options. The components that do not depend on any options are defined in a special forecast BOM.

If the demand distribution for all options can be estimated, then BOM explosion can determine the component quantity by multiplying the forecasted finished item demand with the BOM factor and the option probability. The result of the BOM explosion may be stored in a memory as a special kinds of production planning orders called "production planning orders without final assembly." This kind of production planning order may not trigger production. Some production planning orders cannot be produced because, for example, components that depend on options are either missing or do not exist (e.g., since option variants may not be available) for every possible option. Thus, the production planning order may not specify the options to be produced. These production planning orders may be used to determine dependent material demand and estimate capacity requirements.

The component demand of these production planning orders triggers component procurement. If a component does not have options on its own, then it can be procured to stock. If a component does have options, then the planning without final assembly process may be repeated for the component.

In the planning without final assembly, process supply planning may wait for customer requirements defining the exact configuration until it can create planned production orders, which can actually be produced. At the same time, the planned independent requirement may be reduced by the amount of the customer requirement. Subsequently, supply planning may also reduce the amount of the planned production order without final assembly. Thus, the total demand quantity on assembly level for a certain period of time may not be changed until the total amount of customer requirements exceeds the amount of planned independent requirements. Component stock, which was procured based on the dependent demand of the planned production orders without final assembly, can now be used to cover the dependent demand of the real planned production orders.

Forecasting on finished item level may be combined with forecasting preconfigured variants, for example. Some very popular variants can be produced on stock with the help of forecasting preconfigured variants, whereas the majority of less popular product option combinations is planned using the "planning without final assembly" process. In this case, the planner has to consider the variants when estimating the distribution of a product option. If "color=red" is available as a product variant, then fewer customers will order a freely configured red product.

To support this process, a customer requirement consumes the correct planned independent requirement. With the customer requirement, part of the forecast becomes reality. The forecast may no longer be needed and may be reduced by the customer requirement quantity. Supply planning will consider the customer requirement as material demand instead. Forecast consumption may first search for a PIR instance referencing the PRS of the customer requirement. If such a PIR instance exists, then it may be consumed. This may support forecasting product variants. If the forecast consumption does not find a planned independent requirement instance for the PRS of the customer requirement, then the PIR referencing a forecast PRS may be consumed.

In some implementations, forecasting on a Finished Item Level may be performed with a Forecast PRS. If the demand distribution for all options can be estimated then BOM explosion can determine the component quantity by multiplying the forecasted finished item demand with the BOM factor and the option probability, an example of which is illustrated in U.S. Patent Pub. No.: US 2004/0078253.

The forecast represents multiple future sales orders, which could require different options of the product. The mix of product options may be represented by a special type of product requirement specification called a "forecast PRS." The forecast PRS allows to value a property multiple times specifying the usage probability of every property value. The BOM explosion can determine the total component demand based on the demand forecast on the finished item level and the BOM factor. The total component demand may be split according to the usage probabilities. Dependent demand may be created for those quantities.

For example, a product has the options of color and power. A red case may be required for red products and the blue case may be required for blue products (BOM factor is 1). The planner creates a forecast for the finished item specifying a total demand of 100 units. The planner also creates a forecast PRS defining that he expects sales of 40% red and 60% blue products. Planning will then create a production planning order with dependent demand for 40 units red cases and 60 units blue cases.

The planner does not have to guess the combination of the different options that the customer will choose. For example, the planner does not have to guess how many red products use which kind of engine. This kind of production planning order may not be produced without additional information on the combination of required product options. However, this information is not available until sales order entry. Therefore, planning with forecasting PRS creates production planning orders in a special planning without final assembly planning segment.

Forecasting may be based on Planning Material Level. Actual demand for a material will almost always differ from the forecast. The law of large numbers states that as the sample size grows larger, the difference between the sample mean and the population mean (material demand per time) will approach zero. Forecasting material demand on a group or category of materials is more accurate than forecasting an individual material demand. The material demand on planning material (or product category) level is covered by a production planning order for the same planning material. This production planning order does not trigger execution. It is also of type "planned production order without final assembly. BOM explosion is used to determine component demand and estimate capacity requirements. Materials, which are forecasted by the same planning material, may share the most important components and resources, in some implementations.

At step 406, a sales order may be received from a customer, for at least one of the goods. For example, the sales order may be received (e.g., via an XML message, through an interface generated by the server) from a customer computer. The sales order may include product requirements for ordered goods and/or be stored in a memory of the system. The business object may process the sales order to manage order generation and/or to generate product requirement specification based on the sales order. The sales order item specifies the required product. If the product allows options, then the sales order item specifies the required options through product requirements. The price may depend on the selected product options. Property-based pricing computes the sales order item's price considering the selected product options. The ATP (Available-To-Promise) check (e.g., to confirm price, delivery time, etc.) may also be performed.

The PRS may be created and assigned to the Sales Order Item. The product requirement specification can be created in the following processes, for example:

- The product requirement specification is a predefined product variant. The sales agent can search for such product requirement specification by means of a property-based search or by a search for all product requirement specifications of a product. The product requirement specification ID is then entered into the sales order item.
- The product requirement specification is created together with the customer quote. The product requirement specification ID is copied from the customer quote into the sales order.
- The product requirement specification is created by means of an external product configurator. The sales agent who created the product requirement specification also enters the ID into the sales order.
- The product requirement specification is created together with the sales order item in a common UI for both the sales order and the product requirement specification.

To support these different use cases, the system may be capable of maintaining the product requirement specification ID in the sales order item. The sales agent enters the product requirement specification ID into the sales order item. In some implementations, such as in last use cases, the sales agent may not enter the product requirement specification ID into the sales order item.

Frequently, the sales agent has to create a product requirement specification together with the sales order item. In this case, the system creates a PRS instance from the PRS template and populates it with the default values of the PRS template, and a sales order item is populated automatically with the product requirement specification ID, as illustrated in FIG. 4B.

Existing PRS instances may be reused by new sales orders when the PRS defines a product variant. Engineering and sales may agree on a set of predefined product requirement specifications that define the product in more detail. For example, product T-shirts could have the product variants size S color red, size M color blue, etc. In addition, existing PRS instances may be reused when customers order the product with the same options they used in earlier sales orders. For example, an airline may order airplanes, seats, engines, etc. with the same logo. There is a high likelihood that if the airline orders a new plane, the product requirement specification of an earlier sales order can be reused. Reusing existing PRS instances requires finding the relevant PRS instances. The system shall support searching for variant PRS's by properties and regular PRS instances by customer. In some implementations, property based prices may be calculated for various components, as illustrated in FIG. 4C. For example, the processor of the server may execute various business applications and/or business models to determine prices for components (e.g., prices may be retrieved from memories coupled to the server and/or from various vendors). In addition, a business object "sales price list" administers property-specific surcharges to ordered goods in a sales order.

In some implementations, sales order items may be changed. Changing sales order items may be required if the original product description was incomplete, if customers change their minds, or if data was entered incorrectly. At some point in time, sales order changes may conflict with what was already procured, i.e., it may not be possible to implement the requested changes with the materials already procured/manufactured. Thus, it may be necessary to inhibit such changes. The changeability of the product options may be controlled by the PRS status, so once the PRS is released, it may no longer be changed.

At step 408, a sales order confirmation may be generated at least partially based on the sales order. For example, the PRS BO (product requirement specification business object, such as PRS BO, illustrated in FIGS. 3-1 to 3-5) may generate a sales order confirmation based on the sales order. Sales order confirmations can inform customers of when they can expect their ordered materials.

Determining an order confirmation quickly may be a key differentiator in today's competitive economic environment. The computation of a sales order confirmation may thus be automated. A sales order confirmation may be computed and available for the customer at the time of order entry. In the make-to-specification scenario, as described, the sales order confirmation may be influenced by one or more of the following:

- The time needed to clarify the required product options and the time needed for engineering
- The availability of matching iStock on finished item level left over from cancelled sales orders or excess production
- The availability of components and raw materials
- The lead time required to transform the available components into the required finished product
- The availability of resources
- The supplier lead time of externally procured components (which might be a matter of negotiation with the supplier)
- The time the customer is willing to wait for the product The clarification of the above-mentioned constraints may be a complex task, and thus all or parts may be automated as appropriate. If the dominant constraint is, for example, the availability of a single resource, then it may be possible to model the resource capacity by an allocation and check against the allocation. If experience shows that every demand can be satisfied within a given lead time and if the customer is willing to wait for this lead time, then sales orders can be confirmed against lead time.

If several of the above-mentioned constraints need to be checked simultaneously or if the required resources and components are unclear (as is often the case in an engineer-to-order environment), then the sales agent and/or planner and/or the engineer may collaborate on the sales order confirmation and/or the server may simultaneously check one or more of these. In some implementations, an engineer may need to judge the quality of the description of the product options, and thus the time needed to clarify the required product options may be influence by the waiting time for receipt of such information. In some implementations, a planner can decide whether it is worth downgrading high-quality iStock to satisfy low-quality customer requirements. Thus, waiting time may be influence by waiting to receive information from a sales agent who can judge if the customer is willing to wait for a given period of time. The creation of the order confirmation is, therefore, a cooperative task of sales agent, planner, and engineer, where each participant/portion of the system clarifies different questions.

The objectives of the sales order confirmation may include:
- The sales order confirmation may be computed automatically and synchronously, if possible, with reasonable effort. The sales agent and/or the customer may get immediate feedback and/or the supply planner should be relieved from routine tasks.
- If the system confirmed a later than requested delivery date, the customer or sales agent may have the ability to escalate sales order confirmation to planning. The sales agent or customer should specify the reason that the customer is not satisfied with the automatically-created sales order confirmation.

The system may inform the sales agent of alternatives. These alternatives may include partial delivery or delivery of the product without an option that cannot be provided in time.

In case of doubt, the system may inform the sales agent that a sales order confirmation cannot be worked out automatically. The sales agent then informs the customer that the order confirmation will require more time, and then escalate the order confirmation to planning.

If engineering is required, the system may inform the sales agent that a sales order confirmation cannot be worked out automatically, but will require receipt of further information, such as modified PRS BO from an engineer. The confirmation may be automatically generated after receipt of such information. The sales agent may then inform the customer that the order confirmation will require more time, and then escalate the order confirmation to planning and engineering.

The system may forward all escalated sales order confirmations to the responsible planner.

The system may provide the planner a means to evaluate the constraints that originally led to the late confirmation along with guidance on how to define the constraints. If the constraint is, for example, a resource with insufficient capacity, then the system could propose adjusting the capacity using alternative resources, subcontracting, or postponing other production orders for the same resource.

If the planner confirms the sales order, then the escalation of the sales order confirmation is closed.

In some implementations, an ATP check (or Available-To-Promise check) may create the sales order confirmation, which tells the customer when he or she can expect the ordered material. In a make-to-stock scenario, ATP can be checked against inventory and planned material receipts. A make-to-specification scenario may be more complex because an initial ATP check cannot normally be based on inventory and planned material receipt, as matching inventory may not yet exist. The following example ATP check methods can be used to confirm make-to-specification sales orders automatically: ATP check against inventory and planned material receipts, ATP check against replenishment lead time, and/or ATP check against allocations.

An ATP check against inventory and planned material receipts determines when sufficient inventory and material receipts with the required product options exist to cover the material requirement. Material receipts are considered if they existed prior to performing the ATP check. Material receipts with the required product options may exist when an ATP check is performed; for example, the product requirement specification selected in the sales order was predefined to describe a frequently used set of product options. The product requirement specification describes a product variant. The product variant was forecasted and planned in advance. As another example, the ATP check is not performed during sales order entry but after planning has had the chance to create material receipt with the required product options. The initial ATP check during sales order entry was performed using a different ATP method. As another example, the ATP check is not performed synchronously during sales order entry, but asynchronously. At the time of sales order entry, a confirmation task was created. The planner receives the confirmation task, creates suitable material receipts for the sales order, and then performs an ATP check against planned material receipts. This ATP method may support an initial synchronous ATP check in the case of product variants.

In some implementations, the ATP check may be performed against replenishment lead time. If it is possible to cover most or all foreseeable material demand within a well-defined replenishment lead time and if the typical customer is willing to wait for this lead-time, then new sales orders can be confirmed against the replenishment lead time. The ATP check against replenishment lead time simply adds the replenishment lead time to the order entry date. The result is the confirmed delivery date. The ATP check against replenishment lead time stores the original order entry date. Subsequent re-checks use the original order entry date. If the ATP check always added the replenishment lead time to the current time, then every re-check would move the confirmation date out further. Some sales orders would not be shipped (e.g., site logistics requisitions are created only for logistics execution requisitions with a confirmed date within a limited period of time).

The ATP check against replenishment lead time can be combined with an ATP check against inventory and planned material receipts. In this case, the ATP check against inventory and planned material receipts is performed within the reliability horizon, which is equal or shorter than the replenishment lead time. The replenishment lead time represents the duration needed to plan and procure the finished item and all non-forecasted demand-driven components. The reliability horizon is equal or shorter than the duration needed to procure the finished item (without planning). By the time the confirmed date reaches the reliability horizon, planning should have had enough time to create a material receipt (a production planning order, for example) for the finished item. From this time on, the ATP check can be performed against inventory and planned material receipts. If no inventory or planned material receipts exist, then the confirmed date is moved to the end of the reliability horizon. This check method supports a synchronous ATP check. The customer may receive the confirmation immediately.

If the material is forecasted on finished item level, then the ATP check for sales orders may be based on planned independent requirements. The product is forecasted on finished item level using "planning without final assembly." If the sales order quantity does not exceed the forecasted quantity, then it is assumed, that components have already been procured and can be assembled in a short period of time. The ATP check succeeds if sufficient unconsumed matching forecast quantity exists prior to the requirement date. If the material is both sold to customers and used for internal requirements (dependent demand or stock transfer demand), then two different planned independent requirement instances are used as placeholders for sales orders and internal demand. The ATP check for sales orders is only performed against the planned independent requirements representing sales order demand. This check method supports a synchronous ATP check.

The ATP check may be performed against allocations. Allocations define the maximum possible quantity of a material, a product group, an option, or similar that can be delivered in a period of time. Allocations can be used to model different constraints, such as the total capacity of bottleneck resources; the total supply of constraint components; a share of total capacity (e.g., which may be used by regular orders, a remainder of capacity may be reserved for short term sales orders that are sold at a premium price); and limited supply of a finished product and its distribution among several customers, sales organizations, or distribution channels.

For example, an allocation may specify the daily or weekly capacity of the bottleneck resource (40 hours every week for example). Every material that requires the bottleneck resource for production references the allocation-ID, the conversion factor between the planning unit of measure of the material and the unit of measure of the allocation (1 hour per piece, for example), and possibly, the down-stream lead time required for processing the material after it completed processing on the bottleneck resource. These attributes can be defined in the material. The ATP check subtracts the downstream lead time from the requested delivery date and checks if sufficient unconsumed cumulated allocation is available. If not, the ATP check determines the earliest feasible delivery date by searching for the first point in time where the cumulated unconsumed allocation is equal to or greater than the required allocation quantity.

The consumption of allocations can be monitored and allocations adjusted, if necessary, in a work center similar to that described herein. This check method supports a synchronous ATP check.

If the sales agent or the customer is satisfied with the confirmation proposed by the system, the sales order confirmation can be escalated by the sales agent or customer to planning. The planner can then try to create a more favorable confirmation. This may require the asynchronous ATP check infrastructure. An asynchronous ATP check can also be triggered immediately at the time of sales order entry. An asynchronous ATP check is necessary if an automatic ATP check is not possible. An automatic ATP check is may not be possible if:

The order requires tasks that are not modeled in BoOs/routings or other master data. This is especially true for the engineer-to-order scenario, where engineering is typically not modeled.

The lead time depends on the required product options and whether the required options of the product are described in an unformatted way (free text, sketches, technical drawings) that cannot be interpreted by the ATP check.

The production process is not modeled accurately enough.

Whether an ATP check is synchronous or asynchronous may be decided by the ATP function. The sales order, however, should not be required to interpret ATP configuration. Therefore, the communication pattern between sales order processing and customer requirements processing is always the pattern of the synchronous ATP check.

In case of an asynchronous ATP check, the following details may need to be adapted:

Message "Product Available to Promise Check Request" does not create a provisional customer requirement.

Customer requirement processing informs sales order processing that an ATP check has not yet been performed using message "Product Available to Promise Update Notification." The sales order does not create confirmed item schedule lines in this case.

The "maintain customer requirement" inbound agent creates the following objects for items, which are subject to the asynchronous ATP check:

An external request item of a customer requirement, but no availability confirmation item.

A planning irrelevant supply planning requirement item, if possible.

A confirmation task.

Whether the ATP check is performed synchronously or asynchronously depends on when the ATP check is performed. This is independent of how the ATP check is performed. Therefore, the availability confirmation mode code should not be used to control the asynchronous ATP check; a new code is required.

The system may provide the sales agent with automatically-created order confirmations and may also provide recommendations for acquiring a more favorable order confirmation, if the customer is not willing to accept the automatically-created proposal. The ATP check potentially checks different types of constraints, such as hard constraints that are rigid and that are flexible. If the constraint that caused a late confirmation is not a hard constraint, then it may escalate the order confirmation to planning with a request for a more favorable order confirmation. If resource capacity is, for example, the dominant constraint, which is checked during the ATP check (for example by means of allocations), overtime may be approved for a resource to acquire the new sales order. This is only possible if the resource satisfies other criteria, such as working fewer than 24 hours a day. Once the resource works 24 hours a day and there are no alternative resources, the resource becomes a hard constraint and planning cannot then promise a more favorable delivery date.

With allocations, it is possible to reserve part of the constraint resource or constraint component for short-term demand, which is sold at a premium price. This allows more options for the sales agent. When the sales order is saved in CRM, an asynchronous message is sent to SCC to inform SCC of the sales order changes. The "maintain customer requirement" inbound agent may receive the message from sales order processing, perform some consistency checks, and create a customer requirement instance for every sales order.

At step 410, a plan for production of the ordered goods may be generated. For example, a planning product requirement specification business object (PPRS BO) may generate the plan for production based on the product requirement specification. Decision support may be available to planners. The confirmation task may inform the planner of an unconfirmed customer requirement item or an escalated sales order confirmation where the customer is not willing to accept the delivery date proposed by an automatic ATP check. Depending on the available data, the confirmation task and customer requirement guide the user through processing of the new customer requirement.

An incomplete description of the required product options may make it necessary to contact the customer and clarify the undefined product options. New, previously unknown customer requirements may make it necessary to involve engineering to engineer the product and create and release BOM and BoO (routing). Detailed supply planning is only feasible after engineering has finished its task (even though it may be possible to procure some components sooner). In this case, the confirmation may need to be handled between planning and engineering. The required product options may influence the lead time and many other production planning decisions. The planner may need to check the required product options to estimate lead time and confirm a feasible delivery date. Production may use different product options than sales. In this event, the production planner translates the product options used by sales into the product options used by production. The confirmation task may allow the planner to interactively select the proper planning PRS defining the product options relevant for planning and production. Any existing iStock left over from earlier sales orders could be reused to cover the new customer requirement. The iStock may not require the exact requested product options if, to receive the product more quickly, the customer is willing to accept a similar product that is already in stock. The iStock may also be reworked. This may be possible from the confirmation task of the asynchronous ATP check.

In some implementations, sales options may need to be translated to planning options. For example, product options used in production and planning can differ from the product options used in sales. As another example, only a subset of all product options is production-relevant. The customer may choose, for example, gift-wrapping, which can be done in the delivery process. Thus, this product option is not production-relevant. Two customer requirements, which differ only in the gift-wrap option, may be covered by one single production planning order. This saves set-up and administrative costs. As another example, if the customer is indifferent to some of the product options and selects other components, lead time may be reduced if the system selects options in which the customer is indifferent based on availability. In this case, a single PRS could be used and the manufacturer could select the unspecified options on behalf of the customer. However it would not be possible to change these options again if the availability of components changes. A more flexible solution may be different PRS instances representing the sales options and the planning options.

As another example, if the customer is indifferent to some of the product options, if a matching production planning order already exists, production lots could be merged and enlarged to cover the new customer requirement. The unspecified product options may be determined from the options contained in the existing production planning order. Again, a single PRS could be used and the manufacturer could select the unspecified options on behalf of the customer. However, it would not be possible to regroup production planning orders.

Another case of customer indifference with respect to product options may be quality. If the option "quality" has the possible values "high," "medium," and "low," and the customer orders a low-quality product, they will be satisfied to receive a high or medium quality product for the same price. If there is insufficient low-quality material in stock to cover the customer requirement, then substituting existing high-quality inventory may be more cost-effective than procuring new low-quality material. This process is called "down-binning" or "down-grading." For example, a company may produce windows. The customer may order any size of window. The windows are produced by cutting wooden profiles and glass panes according to the required sizes. Wooden profiles and glass panes with standard sizes are available in stock. The standard lengths may be 1 m, 1.5 m, and 2 m. The following set of predefined BOMs define the maximum sizes that can be built from these components: 1 m×1 m, 1.5 m×1 m, 1.5 m×1.5 m 2 m×1 m, 2 m×1.5 m, and 2 m×2 m. If the customer orders a 1.45 m×1.17 m size window, the 1.5 m×1.5 m BOM are used, and the wooden profiles and window pane cut according to the size specified by the customer.

In use-cases, production options that differ from sales options are effective only if possible production options are predefined. A feature of the system may be using existing stock or lot-sizing for sales orders with similar options. Predefined product options can be defined in a (variant) PRS.

Translation of sales options into planning options may include various operations. For example, a predefined PRS may be created and released for every required combination of planning options. These PRS instances are referred to as "planning PRS". During sales order entry, regular PRS instances may be created. An asynchronous ATP-check may be performed. A planning irrelevant customer requirements may be created in DU supply chain control. This planning irrelevant customer requirement may reference the PRS created during sales order entry. The planning PRS is predefined and released. The PRS, which is entered in the sales order, may or may not be predefined. The customer requirement may be equipped with an additional reference to the planning PRS, which is not populated initially. During the manual ATP check, the planner first selects the planning PRS that best fits the required options specified in the PRS created during sales order entry. The reference to this PRS is stored in the customer requirement. The customer requirement then creates a supply planning requirement in the planning segment of the planning PRS. An ATP-check against inventory and planned material receipts may then be performed in this planning segment. After a successful ATP check, the logistics execution requisition is created, which references both the regular PRS created during sales order entry and the planning PRS.

The ATP confirmation of the customer requirement may create a logistics execution requisition. At a later time, the logistics execution requisition may notify site logistics that the material may be taken from stock and shipped to the customer. At the time of the ATP confirmation, the material is typically not yet in stock in the make-to-specification scenario. The logistics execution requisition is not needed until later. The logistics execution requisition references both the sales PRS and the planning PRS. Both PRS references are populated from the customer requirement.

If the material with the options defined in the planning PRS is not in stock, MRP may create production planning to trigger production of the missing material. MRP may then create production planning orders in the planning segment defined by the predefined planning PRS. The production planning order references only the planning PRS. Next, the production planning orders are requested for production. This triggers the creation of production requisitions, production requests, production orders, etc. (all referencing the planning PRS), and notifies factory workers to produce what is specified in the planning PRS. Additionally, the business objects used in production are equipped with a reference to the planning PRS. In some implementations, the production request may be equipped with a reference to the planning PRS and production order, production lot, and the production task references the planning PRS indirectly via the production request (production order, production lot, and production task reference the production request).

Inventory with different uses may be separated by means of iStock. The production lot may provide an action to create an iStock instance. By default, the iStock references the planning PRS. Inventory separation may be done, for example, with labels on the material or by storing the material in separate bins. Labels may indicate the iStock number and storage bins may be associated with the iStock instance. Production completion may be posted on the production lot. Production completion may result in inventory and a production confirmation instance. The inventory by default references the iStock created earlier by the production lot. If the quality of the produced material does not match what was planned, then inventory may also be posted in a different iStock. The material that was produced needs to be shipped (and packaged according to specification, if applicable) to the customer. A site logistics requisition, site logistics request, and outbound delivery request are created from the logistics execution requisition. Site logistics requests are later copied into site-logistics orders, lots, and tasks, which inform warehouse personnel what to pick and how to package it before shipping it to the customer. The inventory to be selected is defined by the planning PRS. The original customer request, which may be relevant for packaging purposes, is also defined by the sales PRS. Both PRS instances are referenced by the site logistics objects.

The outbound delivery request may be sent to the customer, together with the product. The customer may not be informed of what was planned and what quality they received (i.e., if customer requested and paid for medium quality, but received high quality), so that the customer may not in the future expect better quality for less. Therefore, the outbound delivery request and the outbound delivery may not reference the planning PRS.

The planning options may be determined automatically. For example, when sales options are specified by means of properties and planning options are a subset of the sales options the planning options may be determined automatically.

The PRS template may define which product options are relevant to planning. The automatic translation of sales into planning options collects the property values or the planning-relevant properties from the sales PRS. It then searches for a PRS instance with the very same set of property values.

Supply planning creates production and procurement planning orders to cover the material demand processed in the previous step. Production planning orders may have one or more of the following features. The production planning order action "Request production" creates a production requisition. Production requisitions are sent to production execution where they are used to create production requests, production orders, etc. The production planning order component demands are used to determine total demand for component materials. The production planning order capacity requirements are used to check the availability of resources. The production planning order references the source of supply, which can be checked, for example, when requesting production.

Production and procurement planning orders are typically created by an MRP run. In the make-to-specification scenario, the MRP may create production and procurement planning orders in the special make-to-specification planning segments created by the material demand. Every make-to-specification material demand is potentially different and reuse potential of excess inventory is low. To minimize surplus quantities, material receipts in make-to-specification planning should cover material demand exactly. This can be achieved by using the lot-for-lot lot-sizing procedure. For technical reasons, it may be necessary to consider minimum or maximum order quantities. In this case, the "last-lot-exact" feature may be used to minimize surplus quantities. The "last-lot-exact" feature of the lot-sizing procedure may reduce the last planned (as opposed to firmed) production or procurement planning order in time, so that the projected stock is zero after the production or procurement planning order.

MRP then creates a production or procurement planning order in the given planning segment with the given production model and with the quantity calculated by the lot-sizing procedure. The planner will eventually request production for a production planning order. In the make-to-specification scenario, this may require checking the PRS status. This can be used to ensure, that product options are no longer changed after production has started.

At step 412, the ordered goods may be produced based on the plan. For example, the system may transmit a message and/or approve for production the manufacturing of the goods, for example. The ordered goods may then be generated based on the plan (e.g., the source of supply in the plan, the components in the plan, etc.). The components and operations required for a production planning order may depend on the product requirement specification. If the required product options are described by means of properties in the PRS and if the BOM item or the BoO item has a selection condition defining for which property values it is needed, then BOM explosion can determine the required components and operations automatically.

The different make-to-specification scenarios may influence the status values of the product requirement specification required to perform the next step in the process. The following table shows the required status values for selected make-to-specification scenarios.

| Scenario | Examples | Allowed status of PR-Spec in sales order | Allowed status of PR-Spec in supply planning requirement | Allowed status of PR-Spec in production requisition | How and when is PR-Spec released |
| --- | --- | --- | --- | --- | --- |
| Configurable product | PC, car, kitchen | Creation, Evaluation, Released | Creation, Evaluation, Released | Released | Automatically when production is requested |
| Unformatted requirements w/o engineering activities | Sketch of a window | Creation, Evaluation, Released | Creation, Evaluation, Released | Released | Automatically when production is requested |
| Unformatted requirements w/ engineering activities | Production equipment | Creation, Evaluation, Released | Creation, Evaluation, Released | Released | Manually by engineering department |
| Predefined Variant | T-shirt | Released | Released | Released | Manually when predefined PR-Spec is created |

When production is requested for a production planning order, then a production requisition may be created and is transmitted to the production system (DU production and site logistics execution PSLE) by means of a message. In the production system a production request is created. If the production request is released, then a production order may be created. When procurement is requested for a procurement planning order, a purchase requisition may be created and transmitted to the purchasing system (DU purchasing). In the purchasing system, a purchase request that informs the purchaser to create a purchase order may be created.

Typically, production or procurement is requested automatically for production and procurement planning orders within a certain period (opening period). At this point, checks are executed to prevent unwanted or premature procurement of material. Possible preconditions for production may include:

BOM and routing have status released and are valid at the production start time.

The explosion of the production planning order is valid at the production start time (a single BOM instance could contain components, which are valid at different periods of time to reflect engineering changes. At the production start time, the BOM and all components are typically valid).

The production planning order components are available (can be checked by means of an ATP check).

Capacity of the required resources is available.

The customer is not located in an embargo country.

The credit check of the customer succeeded.

The request profile controls checks (e.g., ATP checks) often succeed before production can start. The request profile depends on the product category. For every product category, a different set of checks may be performed. In the make-to-specification scenario, the request for production or the request for procurement should also check the PRS status. If executed, this check guarantees that the PRS status shows "Released" and can no longer be changed after production starts. This may not prevent PRS changes before start of production, however. PRS and production planning orders can be changed independently. Changes to the PRS may require re-explosion of BOM and routing/BoO (if components or operations are required only for selected product options). This re-explosion may be performed automatically if the production planning order components were not changed manually. The re-explosion of BOM and routing/BoO may not be possible after components of the production planning order were changed manually (in this case attribute "SOS firmed"/"Source of supply firmed" in the production planning order is correct). Put differently, in some situations, the re-explosion would generally destroy the manual changes and the system may not automatically override manual changes such that the conflict would be solved manually. The planner can, for example, trigger the re-explosion of BOM and routing/BoO manually. The request production check could fail if the PRS was changed later than the production planning order.

Typically, production is requested automatically for all production planning orders within a predefined period of time (opening period). Production is not requested for all production planning orders that fail the request production checks. The planner can easily select these production planning orders by means of the opening period. An indicator of the production planning order then notifies the planner that the PRS has changed after firming the explosion of the production planning order. In this situation, the planner may check if the changed PRS can still be built using the original set of components or trigger re-explosion of BOM and routing manually.

When a production planning order is requested for production, the system creates a production requisition instance in DU SCC and a production request instance in DU PSLE. The production request informs the production supervisor of what needs to be produced. The PRS explains how a product needs to be produced. This information is then forwarded from planning to production for execution, i.e., from business object "production planning order" via "production requisition" to "production request." The production supervisor may create production orders from the production requests and release the production orders. When the production orders are released, the system may create production tasks that inform the workers on the shop floor about what needs to be done at every resource. In the event a worker needs PRS information, the PRS is forwarded from the production requisition via the production order to the production task.

At step 414, an outbound delivery request may be generated. For example, the planning product requirement specification object of the system may generate and define the outbound delivery request. The outbound delivery request may be transmitted to appropriate parties (e.g., customer, planner, etc.). The ordered goods may be delivered to the customer based on the delivery request.

Although process 400 in FIG. 4A illustrates an implementation, similar processes and techniques may be performed at any appropriate time, including concurrently, individually, or in combination. In addition, many of the steps may take place simultaneously and/or in different orders than as shown. Moreover, environment 300 may use or implement similar methods with additional steps, fewer steps, and/or different steps, so long as the methods remain appropriate. For example, a plurality of sales orders may be received and processed. As another example, material requirements may not be forecasted. Furthermore, the PRS BO may be modified when product requirements differ from product requirements in previously received sales orders.

In some implementations, maintaining master data includes creating a template that includes allowed product options for the goods. The template may include one or more groups of options based on properties of the options. The forecasting material requirements may include estimating expected component demand before sales orders are received. This estimate may be at least partially based on at least one of components, finished item level, and total demand for several finished items. A product requirement specification may be created using a product requirement specification business object of the system based on the sales order. The product requirement specification business object may be modified.

In some implementations, a preexisting product requirement specification business object stored in a memory of the system may be retrieved, and a product requirement specification may be created based on the sales order using the retrieved product requirement specification business object. The product requirement specification business object may be modified.

In some implementations, an expected order time may be determined, wherein the expected order time comprises when the customer can expect to receive the goods in the sales order. Checking the expected order date is based on at least one of inventory, planned material receipts, replenishment lead time, allocations, or required product options.

In some implementations, a determination may be made whether a modification to a product requirement specification business object of the system is required to satisfy the sales order; and if modification is required, a product requirement specification may be created using a modified product requirement specification business object of the system based on the sales order. Generating a plan for production of ordered goods may include generating a plan based on at least one of: need to contact customer to clarify undefined product options for the ordered goods, a new customer requirement, a previously unknown customer requirement, or existing stock left over from other sales orders. Allowing ordered goods to be produced includes correlating product options used by production with production options used by sales.

In some implementations, inventory may be rededicated. It could happen that more material than needed was procured using a make-to-specification scenario. The excess stock will at first be assigned to the original planning segment even though not all stock is required to cover the demand. In the classic make-to-order process, supply planning always procures exactly the demand quantity. Excess procurement could be the result of variations of the production process. This is, for example, often the case in mill industries. These variations are dealt with by under- and over-delivery tolerances. The full quantity is shipped to the customer. In the make-to-specification process, excess supply can be used for future customer requirements with the same product requirement specification. Whether the excess stock can be used for other customer requirements with different product requirement specifications should be left to human judgment. The system does not reassign excess stock automatically.

During an asynchronous ATP check, the planner could detect that a new demand could (partially) be covered by excess stock. If the excess stock is to be used for a material requirement in a different planning segment, then it has to be reassigned manually. Reassignment of stock is triggered from supply planning in DU SCC. The asynchronous ATP check is performed by the planner, who uses DU SCC work centers. Thus, DU SCC may have full knowledge about all material requirements. Stock may be required for a sales order at some point in the future, for which no outbound delivery exists in DU PSLE. The planner may want to assign the stock to a sales order, for which no outbound delivery exists in DU PSLE. The planner may achieve this in a distributed environment. iStock is typically created and changed in DU PSLE. DU SCC, but first has to acquire change permission. Acquiring the change permission locks the iStock in DU PSLE. This may also change product requirement specification in iStock and return change permission to DU PSLE.

Figures 3, 4, 5:
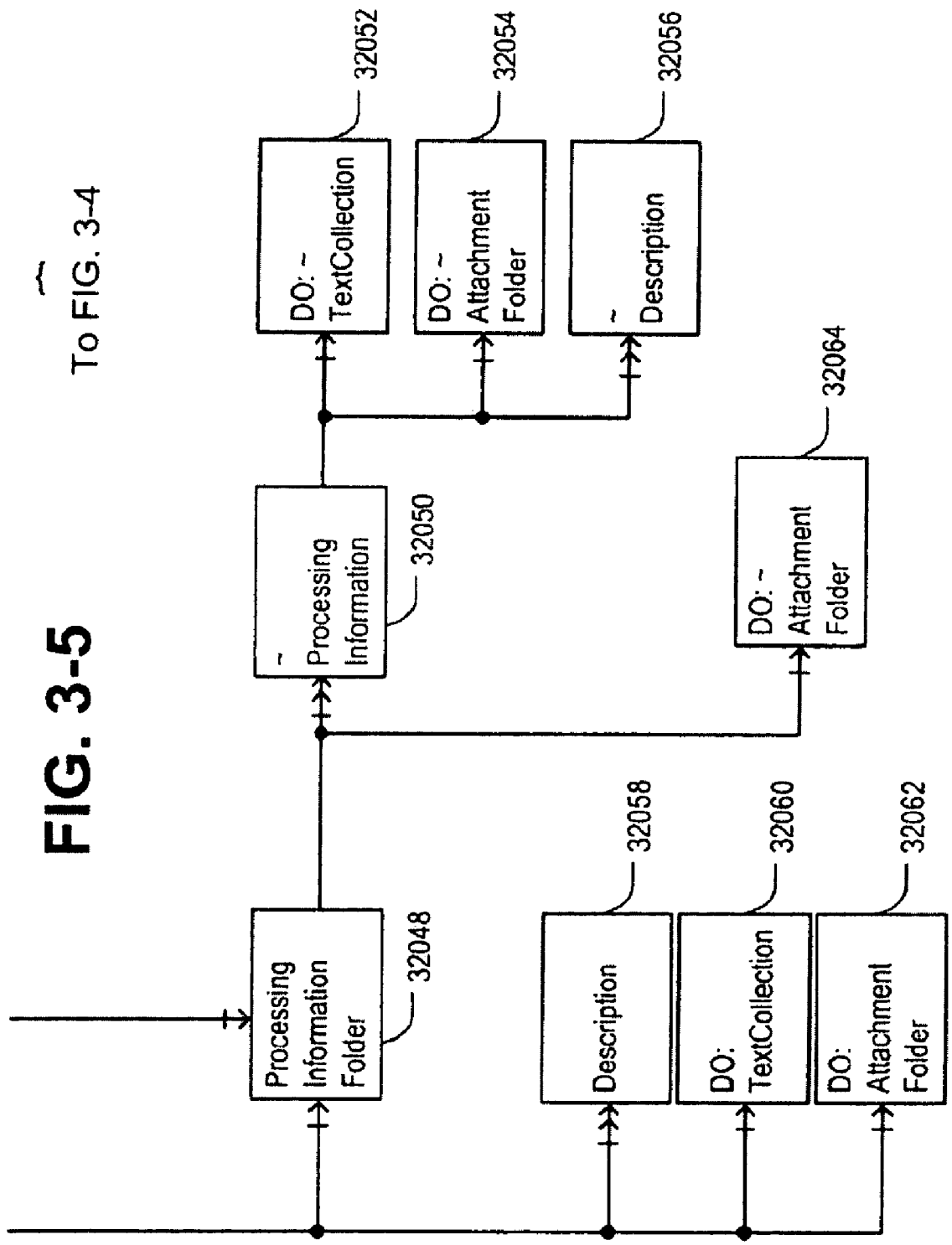

FIG. 5 illustrates an example process 500 for planning goods production in the management of the ordering of goods and is implemented by environments, such as environment 300. At step 538, a sales order for one of the goods that includes product requirements may be received from a customer. The sales order may be received by server 325 from a client device for processing by PRS BO, for example. At step 540, a determination may be made regarding which of the product requirements will be satisfied in the production of the ordered goods. A business object in the environment may process the sales order to determine which product requirements to satisfy and which product requirements will be modified during production. For example, if a customer is purchasing a computer, the customer may specify a dual processor, but if excess quad processors exist in the inventory, then the dual processor product requirement may be modified to be a quad processor. The customer may not mind the modification since the component in the ordered good was an upgraded quality processor.

At step 542, a product requirement specification using a PRS BO of the server may be created based on the sales order and the determination of which product requirements will be satisfied. For example, the product requirement specification may include components that are included in the product requirements of the sales order and one or more components that are not on the product requirement (e.g., the components on the product requirements of the sales order have been replaced with other components). At step 544, a determination may be made regarding the source of the supply for the components of the ordered goods based on the product requirement specification. At step 546, a plan for the production of the ordered goods may be generated. For example, a planning business object may generate a plan based on the product requirement specification. At step 548, ordered goods may be produced based on the plan. At step 550, goods may be shipped to the customer. For example, a business object of the system may generate an outbound delivery request, which is defined by the planning product requirement specification object of the system, and the ordered goods may be delivered to the customer based on the delivery request.

Although process 500 in FIG. 5 illustrates an implementation, similar processes and techniques may be performed at any appropriate time, including concurrently, individually, or in combination. In addition, many of the steps may take place simultaneously and/or in different orders than as shown. Moreover, environment 300 may use or implement similar methods with additional steps, fewer steps, and/or different steps, so long as the methods remain appropriate. For example, a determination may be made regarding whether the sales order lacks product requirements. As another example, a determination may made regarding whether one or more of the product requirements requires modification of the product requirement specification business object. The product requirement specification business object may be modified based on the sales order, if required. A product requirement specification may be created using the modified product requirement specification business object of the system.

As another example, a determination may be made regarding lead time for components of the ordered goods based on the product requirements, and a delivery date may be verified in a sales order confirmation based on the determined lead time. A determination may be made regarding which product options will be utilized in the production of the ordered goods based on the determination of which product requirements will be satisfied. The product option may not be associated with the same component as the component associated with the product requirement. The product option may include at least one unused component from earlier sales orders, and the unused components from earlier sales orders may be correlated to product requirements in the sales order to allow production of the ordered goods using at least one of the unused components from earlier sales orders. Correlating unused components may be at least partially based on whether the customer is willing to accept a similar product.

In some implementations, determining a source of supply for the components of the ordered goods based on the product requirement specification may include mapping between the sales product requirement specification business object and a planning product requirement specification. A determination of which product requirements will be satisfied may include identifying product requirements to which the customer is indifferent. The product requirement specification business object may be configured such that when a product specification is generated, components other than the components specified in the identified product requirements are utilized in the generated product requirement specification. Components other than the components specified may include unused components form other sales orders.

In some implementations, a first classification may be determined for one of the product requirements, and the product requirement specification business object may be configured such that a component of a higher classification than the first classification is included in the product requirement specification generated by the product requirement specification business object.

Generating a plan for production of the ordered goods may include a planning product requirement specification business object, and the planning product requirement specification business object is configured to generate the product requirement specification based on at least one of inventory or planned material receipts.

In some implementations, the product requirements of the received sales order may be compared to product requirements of previous sales orders to identify a similar previous sales order. A previous product requirement specification business object associated with the identified previous sales order may be identified. A plan may be generated based on the previous product requirement specification generated with the previous product requirement specification business object.

Figure 6:
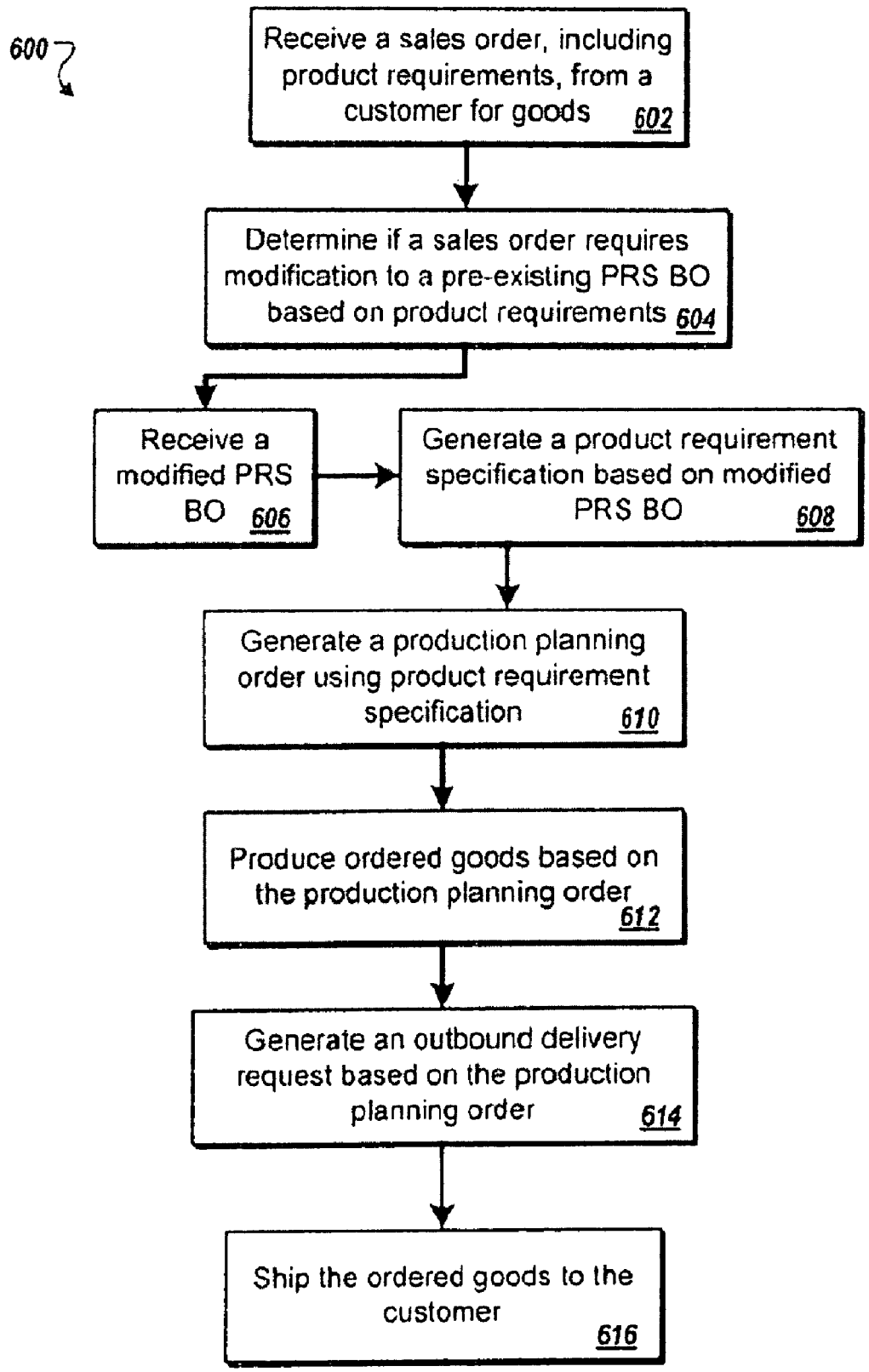
FIG. 6 illustrates an example process for managing orders in accordance with environment 300 illustrated in FIG. 1.

FIG. 6 illustrates an example process 600 implemented by environments, such as environment 300. At step 602, a sales order may be received from a customer for goods. The sales order may include product requirements for ordered goods. The sales order may be received by environment 300 from a user device for processing by PRS BO.

At step 604, a determination may be made whether a received sales order requires modification to a pre-existing product requirement specification business object based on the product requirements. For example, if the product requirements includes a new product requirement (e.g., a product requirement not in previous sales orders), the PRO BO may be modified. The sales order may be analyzed and a determination may be made based on various factors (e.g., previous sales orders, inventory, etc.) whether the PRO BO requires modification. For example, previous sales orders may be retrieved from a memory of the system and compared to the received sales order. As another example, a listing of available options may be retrieved for an ordered good and compared to the product specification in the sales order.

At step 606, a modified product requirement specification business object may be received and incorporated into the environment 300. For example, a template may be generated that includes available options for a good. A modified PRS BO may be generated based on selections received through the template. As another example, the system may determine options that should be included in a PRS BO and automatically generate the modified PRS BO based at least in part on these options and/or previous PRS BOs generated (e.g., previously generated PRS BOs may be stored in a memory and retrieved to facilitate generation of modified PRS BOs). At step 608, a product requirement specification may be generated based on the modified product requirement specification business object.

At step 610, a production planning order may be generated using a planning product requirement specification object of the system and based on the generated product requirement specification. The production planning order may be automatically generated by the system (e.g., various business applications and business objects may be utilized). For example, the system may identify a source of supply for components (e.g., in the inventory or to be ordered from vendors) and generate a plan based on the source of supply. In addition, production times may be identified in the plan based on the lead times and sources of supply.

At step 612, the ordered goods may be produced based on the production planning order and, at step 614, an outbound delivery request may be generated based on the production planning order. At step 616, the ordered goods may be shipped or otherwise delivered to the customer based on the delivery request.

Figure 7A:
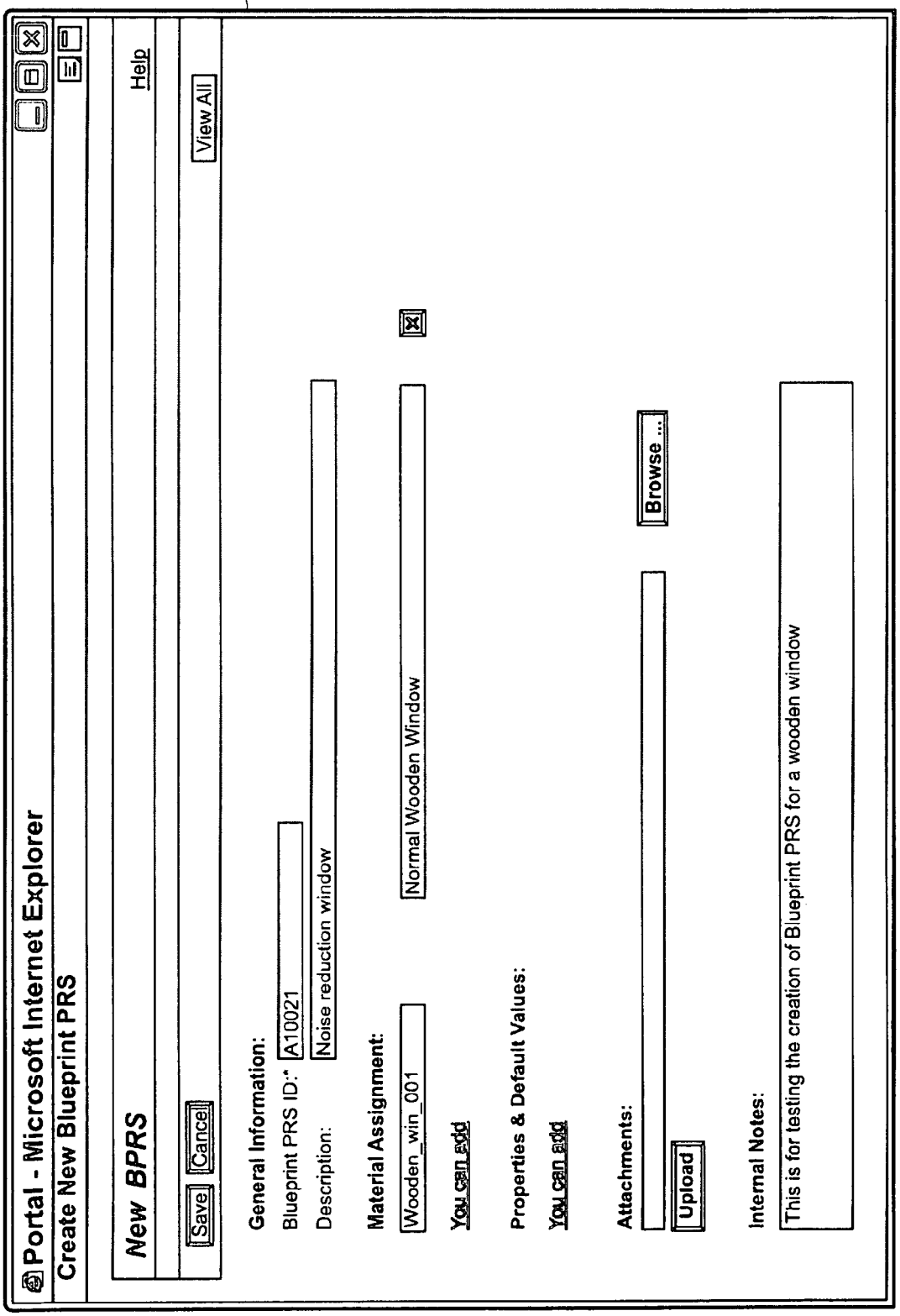
FIG. 7A illustrates an example interface for generation of a product requirement specification business object in accordance with environment 300 illustrated in FIG. 1.

Although process 600 in FIG. 6 illustrates an implementation, similar processes and techniques may be performed at any appropriate time, including concurrently, individually, or in combination. In addition, many of the steps may take place simultaneously and/or in different orders than as shown. Moreover, environment 300 may use or implement similar methods with additional steps, fewer steps, and/or different steps, so long as the methods remain appropriate. For example, a business object product requirement specification template (e.g., Blueprint PRS) may be generated to define the options available for a product. FIG. 7A illustrates an example interface utilized to facilitate the generation of a product requirement specification business object. Options can be defined informally as notes or attached text documents or formally as properties. If the options are defined as properties, then the PRS template can also define the allowed values or value ranges of a product option and its default value. The PRS template may reference multiple products. A product is linked to at most one active PRS template. If a material is referenced by a PRS template, then sales order processing requests that the creator of the sales order create and populate a product requirement specification. The PRS template may be assigned to a product or good. The PRS template supports multiple formats. A text document can be attached to the PRS template. At the time of sales order entry, the sales agent can fill in the blanks of the text. Alternatively, an interactive form may be attached to the PRS-template. At the time of sales order entry, the sales agent may fill out the interactive form (interactive form integration is not planned for market entry). A more formal way of defining product options is by means of properties. In this case, the PRS-template defines the available properties of the product, the possible values and the default values, as illustrated in FIG. 7B. To facilitate generation of modified PRS BOs, the template may be generated for presentation to a user. The user may then select options from this template to create the modified PRS BO. Properties can be grouped into property groups for better clarity. As illustrated, a property groups may be added to the ordered good. Based on the above PRS-template, a valuation user interface can be generated for input of product options during sales order entry.

In some implementations, new customer requirements or other factors may require engineering to create new BOM variants. For example, new customer requirements with a new product requirement specification may make it necessary for engineering to create new BOM variants, bills of operations, or production models. The information the engineer needs is primarily provided by the PRS itself. The required quantity of the product, the due date, the customer, etc., is stored in the sales order and the customer requirement. The where-used-list of the PRS directs the engineer to the relevant objects.

The engineer may now create a new BOM or BOM variant, which satisfies the customer's requirements. Typically, the engineer will just create a new BOM variant. In this case. the system defaults all existing BOM items and the engineer adds and deletes components that are not required for the new variant. FIG. 7C illustrates an example variant listing for a product. Every BOM variant can (but does not have to) reference the product requirement specification of the product variant, which is produced with the BOM variant. If the input product has options, then the engineer should be able to also specify the product options of the BOM item.

When finished with engineering, the engineer links the new production model, an example of which is illustrated in FIG. 7D, with the product requirement specification and enables the production model for planning (action "Enable for planning" or "Enable for planning and execution"). Enabling the production model for planning generates an RPPM and creates a source of supply, which also references the product requirement specification.

The BOM variant or RPPM are templates for production planning orders. The production planning order represents component and resource requirements in planning. When planning (or MRP) detects a material shortage for a material in a supply planning area with a PRS, then it searches for an RPPM (in an other technical implementation it may search for a BOM variant directly) for the current material in the supply planning area with the PRS, which is often termed "sourcing." This template (RPPM or BOM variant) can then be copied into a production planning order and multiplies the production quantity with the quantity factors defined in the BOM item (explosion).

Next, the planner releases the production planning order and then a production order is created from the production planning order. The production order is typically more detailed than the production planning order. To add the missing details in the production order the BOM variant or the RPPM or a similar object has to be exploded again. To this end the function, which creates the production order searches for BOM variants/RPPMs for the material in the supply planning area with the PRS of the production planning order.

In an engineer to order process the sales order and its PRS is typically created first. Then automatic processing may stop to give engineering the chance to engineer the product and create a new BOM variant. After the creation and release of a BOM variant (and the generation of an RPPM), the system can create production planning orders and continue the process. The work list of engineering can be compiled in one of the following example ways: i) PRS instances which are not already referenced by a BOM variant; ii) sales orders, for which supply planning did not find a source of supply (an RPPM); and iii) PRS instances with status "Not yet engineered". The engineer can then change the status once he or she has finished the task The PRS and a corresponding BOM variant can also be created prior to sales order entry (if we know what the customer wants). In this case the sales order only references the predefined PRS. Supply planning can use the existing BOM variant immediately. This is the difference between pret-a-porter and haute-couture. In both cases you have product options (sizes, colors, patterns, etc.) but in pret-a-porter engineering is done prior to sales. If a company wants to sell popular variants (the variant is defined by product-ID and PRS) of a product from stock (advantage for the customer is minimum lead time) and engineer custom variants of the same product to order (advantage for the customer is possibility for customization), then there exist two types of PRSs: Predefined PRS and custom PRS.

A predefined PRS may be used in demand forecasting, but not a custom PRS. During sales order entry the sales agent either references a predefined PRS or creates a new custom PRS (except for the rare cases where a customer orders exactly the same custom product again, that he or she ordered before, in which case a custom PRS can be resued). To support this use-case the value help for the PRS-reference in the sales order should by default suggest predefined PRSs. Predefined PRSs and custom PRSs can be differentiated with an attribute on root node level of the PRS, which is set by the planners or engineers when creating a predefined PRS.

Figure 7E:
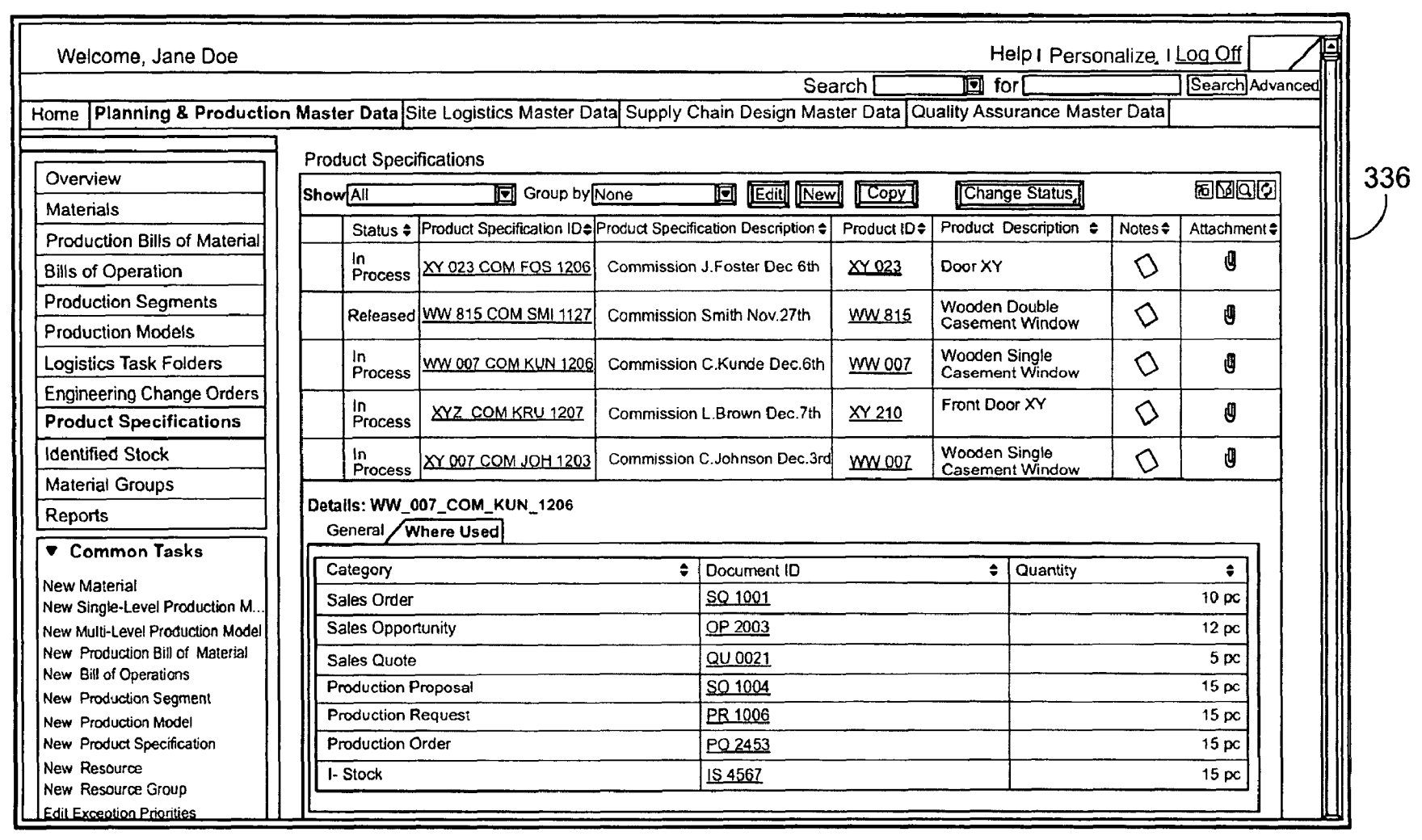

The next MRP will then try to cover the customer requirement with a production planning order using the newly created production model. As illustrated in FIG. 7E, an interface may be generated by the system that presents the newly created production model and/or previously created production models. Newly created production model may be identified through the source of supply.

A production model associates zero or one product requirement specification instance. If a production model associates a product requirement specification, then the product requirement specification uniquely defines what is built with the production model. Supply planning uses this product requirement specification to determine the proper source of supply. Other product requirement specifications might describe the very same product with the very same product options. Such equivalent product requirement specifications can be planned and produced by using a separate production model which is created for every product requirement specification and/or a mapping which is made between a sales-PRS and a planning-PRS.

In some implementations of the planning segments, a "maintain customer requirements" message communicates the customer requirements from sales order processing to customer requirements management. Customer requirements management creates a supply planning requirement, which informs process component supply and demand matching about the new sales order. The supply planning requirement is a material demand in a planning segment.

In some implementations, Supply and Demand Matching (SDM) monitors and controls the movement of material through the supply chain. It combines all tasks necessary to ensure that sufficient material receipt elements exist to cover material demand at all levels. Key to this task is knowledge about material receipts and requirements in the supply chain. Material receipts include inventory, production planning order, and procurement planning orders. Material requirements include supply planning requirements, planned independent requirement, dependent demand from production and stock transfer, and safety stock.

SDM may use a material's inventory in a location to cover any material requirement for the same material in the location. If inventory does not suffice to cover the material requirements, then SDM can create additional material receipts for the same material and location. Material receipts cover the material requirements for the same material in the location. This is defined by the planning segment. The planning segment is a property of every material receipt and material requirement. Material receipts have the same planning segment as the material requirements they are supposed to cover. The planning segment may be defined by material and the location, where the site or the location is a geographic differentiation of material receipts and requirements. Material receipts cannot cover material requirements in a different geographical location unless the material is transferred to that location. Stock transfer is planned by means of stock-transfer orders, which are a material receipt in the receiving location and a material requirement in the sending location. Typically, the stock transfer takes some time, which is represented by an offset between the material requirement time in the sending location and the expected receipt time in the receiving location.

In some cases, the system may plan separately demand for one material in one location but with different origins. Supply planning areas can be used to separate the planning of material demand with different origins if conditions, such as the following, are known:

- The different demand origins are known prior to receiving sales orders. However, a new sales order instance or the new product requirement specification instance is not known generally prior to receiving the sales order, but may be forecasted.
- The warehouse worker should be able to tell in which supply planning area inventory is located. Inventory is located in different bins or labeled to inform the warehouse worker the supply planning area of the material in inventory.

The "supply planning area" can be a generalization of the planning segment key attribute "location". It is possible to define several supply planning areas in one location. Every supply planning area is assigned to one location (site). Supply planning areas are master data and are generally defined prior to planning. The planning segment for planning for a material in a supply planning area is material and supply planning area. The location needs not be part of the planning segment key, since every supply planning area is assigned to exactly one location.

Planning of a material in a supply planning area is controlled by business object "material supply planning process control". Node "supply planning specification" contains parameters to control forecast consumption, lot-sizing, procurement type, etc. This node is material and supply planning area-specific.

Planning with different supply planning areas can be used to support the following processes:

Differentiation of regular production demand and spare part demand: A component is used for production and as spare part, which can be ordered by customers. The spare part is very difficult to forecast and required immediately. Safety stock shall be used to cover spare part demand. The safety stock shall not be "stolen" by regular production demand in case production of the component is delayed or yielded more scrap than planned. The safety stock can be protected from being stolen by production demand by creating two different supply planning areas for spare part demand and production demand.

Differentiation of demand from different customers or different distribution channels: A material without any options is sold to different customers or distribution channels, which need to be planned separately. If a customer is a very large retailer who intends to sell a product during a nation-wide campaign, it will be necessary to build up inventory to satisfy this retailer's demand. Other customers or distribution channels shall not "steal" the inventory that was built up for this retailer. The retailer's inventory can be protected from being stolen by creating a separate supply planning area for the retailer's material demand.

Differentiation of demand, which is covered by different suppliers: A material is supplied by different suppliers, who have different lead-times or different delivery rhythms. One supplier might, for example, deliver the material every day, while another supplier delivers the material only once a week. In planning, this can be modeled with different lot-sizing procedures. Daily or fixed lots can be used for the first supplier, Weekly lots can be used for the second supplier. The lot-sizing procedure is performed within a planning segment. To support different lot-sizing procedures for different suppliers, different planning segments are needed. To support this use-case, the system has to be provide a function that automatically determines the material requirements in every supply planning area. This function can either split every material requirement by the predetermined shares of every supplier or it can put complete material requirements into the planning segment with the highest quota and then adjust the quota of that planning segment.

In some implementations, there is a dedicated material receipt for every sales order item. Material receipts cover the material requirements for the same material, supply planning area and sales order item. Different planning segments are created for every required material, supply planning area, and sales order item combination. The planning segment is defined by material, supply planning area, and sales order item. The planning segment is a property of every material receipt and material requirement. Material receipts cover the material requirements with the same planning segment. These various processes and implementations may be used across multiple production levels, provided the complete downstream part of the supply chain. In this case, the production planning order providing material for a certain sales order item creates dependent requirements for the same sales order item. The dependent requirement for the component material references the same sales order item that was referenced by the sales order item for the finished material.

In some implementations, inventory may be made to match product requirements. For example, a product may be cut or blended to customer requirements. Left-over material can be cut or blended differently. The customer may order the requested product ID and physical or chemical properties out of an infinite number of possible values, for example, 100 m cable, 100 pieces sheet metal, 1 meter×2.345 meter, or 10 liters sulfuric acid pH 3.9. Each may be modified to provide different product requirements, such as 10 m cable, or 2 liter of sulfuric acid.

Product requirements define a range of required property values, inventory knows its actual property values, and product receipts specify their expected property values. Supply and Demand Matching has to assign product requirements to matching product receipts and inventory. Supply planning creates new production planning orders for product requirements for which matching product receipts cannot be found. Every product receipt can be assigned to multiple product requirements with different required property values. Every product requirement can be assigned to multiple product receipts with different expected property values.

In some implementations, when a product allows a small number of possible options, there is a high likelihood that the same product with the same product options can also be sold to other customers.

For example:

T-shirts with sizes S, M, L, XL and colors white, red, and black

Heating radiators with possible length of 1 m, 1.2 m, and 1.4 m, up to 2 m

Thus, to allow reuse of inventory and to support lot-sizing for different sales orders requiring the same product options, product requirements with the same product options may be put into the same planning segment. This is implemented by predefined product requirement specifications representing a product variant. During sales order entry, the sales agent selects one of these predefined PRS instances and enters it into the sales order item. The predefined PRS instance should have status "released". However, then the value help for the PRS should be more restrictive. Only released PRS instances should be selected. Additionally, changes to released PRS instances may be inhibited because changing such a PRS instance would have unforeseeable consequences for all sales orders referencing the product requirement specification. If the product requirement specification is created at the time of sales order entry and if two sales order requiring exactly the same product options were created in parallel, then two semantically identical PRS instances would be created. Then, the PRS ID may no longer be used to differentiate orders with different product options and collect orders with identical product options into one planning segment. The planning segment is defined by material ID, supply planning area ID, and product requirement specification ID.

In some implementations, a product may be characterized by a large number of properties with predefined values. The customer selects a property value for every required property.

For example:
- A PC has the options CPU type, clock rate, RAM, hard drive size, graphics accelerator, sound, keyboard layout,
- A car has the options color, power, number of doors, interior design, air conditioning, radio, left- or right-hand steering, equipped as police car, ambulance, taxi-cab, . . .

Thus, the probability is low that the same configuration is ordered a second time. The reuse potential of inventory on finished item level is negligible. The same holds for the reuse of product configurations. Then, the need attempt to find existing product configurations may be reduced. Every sales order item creates its own new product requirement specification instance with its own ID. The planning segment is defined by material-ID, supply planning area ID, and the product requirement specification ID. Supply planning will create separate production planning orders in every planning segment.

In some implementations, the options of the product are not known in advance, but determined during the engineering process together with the customer. BOMs and Routings grow during the engineering process. Other customers specify the product differently. Reuse potential of inventory procured for other customers has a low probability. If a customer orders the product a second time, then there is a good chance, that the product specification can be reused. Examples may include Ships, Planes, Train-Sets, Excavators, Cranes, Production facilities, etc. The planning segment is defined by material-ID, supply planning area ID, and the product requirement specification ID. Supply planning will create separate production planning orders in every planning segment. Sales order processing can reuse one of the same customer's earlier product requirement specifications if the customer wants to procure a second time the same product.

In some implementations, a product produced with the help of the project is described by a product requirement specification. Projects may be divided into several tasks. The cost of each task has to be collected separately. To support this separate production planning, orders are created for components required by different project tasks. The same component described by the same product requirement specification may be used in different project tasks.

When the material in a supply planning area is planned, then all material receipts and all material requirements of the material in the supply planning area were selected and sorted by sales order item ID and date. Planning segments were determined dynamically.

In some implementations, the planning segment is implemented by node "planning segment" of business object "Material Requirements Planning Section." The material requirements planning section is an object with caching and database persistency. The planning segment node is referenced by every material requirement in supply planning (customer requirement items, planning independent requirement items, material inputs of production planning orders, etc.). The planning segment node is also referenced by every material receipt in supply planning (procurement planning order, purchase requisition, planning view of purchase order, logistics execution requisition, production planning order, and production requisition). All material receipts referencing a planning segment node may cover the material requirements referencing the very same planning segment node (unless it is a make-to-matching properties use-case, and provided all temporal constraints are met).

The transformed object "Material Supply and Demand View" is a transient object that collects all material receipts and material requirements of a planning segment. Since the material supply and demand view is transient, it cannot implement its queries on its own data. The queries of the material supply and demand view are delegated to the planning segment node of the material requirements planning section.

The material supply and demand view is the planner's tool to analyze and clarify lot-sizing issues. It is also often used to determine key figures, such as the day's supply (range of coverage) of current inventory, and to monitor progress of the procurement process. The material supply and demand view shows all material receipts and material requirements of a material in a supply planning area with a product requirement specification. Drill-down into the material supply and demand view is possible from every material receipt or material requirement. The drill-down follows the association from the material output or material input to the planning segment and from there to the material supply and demand view. The drill-down will always show the correct planning segment of the material output or material input.

In some implementations, each time a material receipt or a material requirement is changed, the "MRP required indicator" is set in the planning segment. The balance between material receipts and material requirements could be destroyed. An MRP run in net-change mode will select all planning segments with the MRP required indicator and call the MRP action of all selected planning segments. The MRP action performs MRP within the planning segment and resets the MRP required indicator. If it fails, the planning action writes an application log instance, stores the application log reference in the planning segment, and does not reset the MRP required indicator. The next MRP run will then try to plan the material again.

The planner may decide that checking the MRP result or some manual post-processing, such as finite scheduling, is necessary after MRP was performed. In this case, the planner may select planning segments that have not yet been verified and were changed by the last MRP run (last planning run date). After checking or performing the manual post-processing, the planner sets the "verified" indicator. The next MRP for the material in the supply planning area resets the "verified" indicator again.

The root node of BO Material Requirements Planning Section is created when a "supply planning specification" node of business object Material Supply Planning Process Control is created. The supply planning specification node defines if and how a material in a supply planning area is planned. The supply planning specification node is prerequisite for supply planning.

Initially, the material does not have any inventory and inventory is below a reorder quantity. If the material in the supply planning area is planned using consumption-based planning, then it has to be planned by the next MRP. To this end, a planning segment instance with MRP required indicator is necessary. If the material in the supply planning area is subject to consumption-based planning, then the creation of a supply planning specification node will also create a planning segment node for the make-to-stock planning segment.

Make-to-specification planning segments (planning segments referencing a product requirement specification) are created when the first material demand is created for the material in a supply planning area with a product requirement specification. After sales order entry, for example, the sales order is sent to SCC. The SCC inbound agent creates a customer requirement. The customer requirement item references material, supply planning area, and product requirement specification. The customer requirement requests an ID of the corresponding planning segment from the business object Material Requirements Planning Section. If a planning segment for the material in the supply planning area with the product requirement specification does not yet exist, then the business object Material Requirements Planning Section creates a new planning segment.

Material demand for the same material in the same supply planning area with the same product requirement specification could be created in two parallel transactions. The planning segment may be communicated to parallel transactions through a second database connection, which is committed immediately. Parallel transactions may then use the same planning segment ID.

In some implementations, product options may be propagated through the part of the supply chain that is subject to the make-to-specification scenario. Dependent demand of production or stock transfer is planned within a separate planning segment if the component is subject to make-to-specification planning and if the complete downstream supply chain was also planned using the make-to-specification scenario.

A material is subject to the make-to-specification scenario if its iStock-type allows iStock with PRS reference (optional specified stock and mandatory specified stock). The iStock type of a material is valid globally. There is no location or supply planning area-specific iStock-type. Stock-transfer, therefore, propagates product options 1:1 from the receiving location to the supplying location.

The product options of a component are determined by the product options of the material output of a production planning order and by the product options relevant for the component. The dependent demand cannot be more detailed than the output node. The product options, which are relevant for the component, may, however, be a subset of the product options of the finished product. In this case, it is possible to cover material demand from different sales orders with one single production order for all components with the same options. This should reduce set-up and administrative costs compared with individual component production orders for every sales order.

On a finished item level there are the product options color and power. On component level, only one of these options is relevant for every component. This allows material demand to be covered from different finished sales orders requiring different finished item product options with one single production order for all components with the same options.

In some implementations, selective inheritance of product options can be implemented. BOM variants define which components of a super-BOM are needed for a certain variant. BOM variants and components are columns and lines of a matrix, where the cells define if a component is required for a BOM variant. BOM items may reference a PRS of the component. When the product engineer creates a new BOM variant for a new PRS, then he or she assigns the finished material PRS to the product variant and selects the components and component PRSs required to produce the finished item with the requested finished material PRS. The matrix cells define which component with which PRS is needed to produce the output product with a given output product PRS.

When MRP detects a material shortage in a planning segment with a material demand for a certain finished item PRS, then MRP tries to create a production planning order or a procurement planning order to procure the missing material with the PRS. To this end, MRP first selects the sources of supply of the material in the supply planning area where the PRS of the source of supply is either identical with the demand PRS or where the PRS of the source of supply is not specified. Sources of supply with identical PRS have higher priority and are selected if available. Production models referencing BOM variants are sources of supply. This way, MRP will find the BOM variant which is needed to produce the product with the required PRS if available.

MRP will then create production planning orders with this source of supply. The production planning order will explode the BOM copy and the explosion result into its material inputs. Material inputs reference the input PRS if this is defined in the BOM variant.

In some implementations, selective inheritance of product options may be achieved by searching for matching PRS. If the required product options are defined by means of properties and if a subset of these properties defines the planning segments of a component, then the component planning segment can be determined by means of a property-based search. The component PRS is again computed by RPPM explosion, so that the production planning order does not rely on how the component PRS is determined.

In some implementations, default inheritance properties may exist for product options. If the iStock type of a material is optional or mandatory specified stock, then you expect material requirements with product requirement specification if available. If the iStock type of a component is optional or mandatory specified stock, and if the product requirement specification cannot be determined from the BOM item or by property-based search for a matching PRS, then the PRS of the master output shall be copied to the component demand. The iStock type of a material can be changed at any time. After changes of the iStock type material, demand should be put into the correct planning segment, if possible. A sales order with PRS reference cannot be put into a make-to-stock planning segment without loss of information and a PRS cannot be generated for a customer requirement without one. Therefore, the planning segments of sales orders are not changed. The planning segments of production planning order material inputs, however, can be changed easily. After clearing the PRS reference of a material input, the PRS information can still be looked up in the master output of the production planning order. If the change of the iStock type was done by mistake, then the change in the material can be reversed, and after re-exploding all production planning orders consuming the material, the material inputs are again in the proper planning segment. For this to happen automatically, it is necessary to create planning file entries, which require the component, asking for re-explosion of all production planning orders.

In some implementations, demand for make-to-specification materials may be forecasted on finished item level. Such a forecast demand cannot be produced directly since the product options required by the customers are not yet known. MRP creates special "production planning orders without final assembly" to cover such a demand forecast. The objective of these production planning orders is to create regular component demand for make-to-stock components. This allows procurement of the components to stock and utilization of the component stock once a sales order for the finished item is received.

The planned production order without final assembly may be a type of planned production order, rather than a separate business object. Planning with out final assembly is applicable to external procurement and stock transfer. In the case of stock transfer, the "stock transfer order w/o final assembly" is used to trigger procurement in the supplying location. In the case of external procurement, the "procurement planning order w/o final assembly" can be sent to the supplier as demand forecast. It may be possible to combine planning on assembly level with planning w/o final assembly. Planning w/o final assembly can be performed across multiple production levels. Subassemblies on lower BOM levels can also be subject to make-to-specification planning by inheriting the PRS reference of the finished item's production planning order. If an assembly is subject to make-to-specification planning, it cannot be procured in advance, which is the objective of planning w/o final assembly. Instead, the components on lower BOM levels should be procured (i.e., components should be procured on the highest BOM level, which is procured using the make-to-stock scenario).

If an assembly is procured, then the "planning w/o final assembly" property of a production planning order output node is inherited by the material inputs of the production planning order. The dependent requirements of the production planning order are located in a planning w/o final assembly planning segment and are again covered by planning w/o final assembly production planning orders.

The release of the product requirement specification is not required to assert consistency. Consistency is already guaranteed by the product requirement specification's consistency check. The release of the product requirement specification can, therefore, be used to control changeability. Customer orientation demands that a customer be able to change the configuration of his or her product as long as possible. Often, it is not a problem to change the product configuration before production has started. The most serious problem is that components cannot be procured in time. In some cases, the customer will have to accept a later delivery date, which should be possible to communicate to the customer, since the customer is demanding the change. Therefore, it should be possible for the customer to change the configuration of his or her product at least until production has actually started. PRS changes after start of production can be very expensive. Components or the complete product might have to be scrapped or reworked. This can be prevented by checking the PRS status. Released product requirement specifications are not permitted to be changed. If only production planning orders with released PRS are allowed to be produced, then PRS changes are prevented after start of production. The release can be performed automatically when production is requested.

The make-to-specification scenario is designed to support sales and procurement processes for products with options, which can or have to be specified by the customer. The product requirement specification defines the components or parts of a product receipt or a product requirement. The options of the product can be described in the form of text, documents (e.g., technical drawings or sketches), or properties. Often, the product requirement specification is created with the help of a product requirement specification template, which defines the possible options of the product. The product requirement specification can be accessed from any interested party, for example, sales, engineering, supply planning, production, etc. A product requirement specification may be similar to the product requirement specification illustrated in U.S. Patent Publication No. 2008-0162266 A1.

Status handling is a means to control changeability of the product requirement specification. The product requirement specification is equipped with a life-cycle status, which represents the validity of the product requirement specification for any consuming process or business object. The lifecycle variable of the product requirement specification may have the following values: Creation In Process (Indicator that detailed information about requirements, specifications and its assignment relationships can be created and maintained. The product requirement specification can be assigned from further business objects to introduce its relevance within corresponding processes); Evaluation In Process (Indicator that no changes are possible concerning the detailed requirements and their corresponding specifications. It shall be possible to allow detailed evaluation of the fulfillment of the requirements in a kind of frozen state); Released (Indicator that the included requirements and their specifications are valid and have the appropriate fulfillment relations. This is the indication that the content of the product requirement specification is approved to be consistent. It can now be used for definition purpose in the consuming processes or business objects. It is impossible to change any content of the product requirement specification); and Obsolete (Indicator that this product requirement specification is no longer needed for instance due to a change of technology or legal changes that invalidated major parts of its content. The content of the product requirement specification cannot be deleted or changed because there can exist processes or business objects with references to this product requirement specification).

After the RequirementSpecification has reached its released status, changes are no longer possible. It is also not possible to return from status released to a predecessor status. If changes occur, a new version of the product requirement specification is often created. A status model of the product requirement specification may be similar to the status model illustrated in U.S. patent application Ser. No. 11/841,545.

The product requirement specification may define the required options of the following material requirements and the expected or available options of the following material receipts. The product requirement specification may be referenced by one or more of the following business object nodes: Request for quote item, Customer quote item, Sales order item, Customer requirement item, Demand Forecast, Planned independent requirement, Production planning order output nodes, Production planning order input nodes, Production requisition output nodes, Production requisition input nodes, Production request output nodes, Production request input nodes, Procurement planning order item, Purchase requisition item, Purchase order item, Logistics Execution Requisition, Inbound Delivery Request, Inbound Delivery, Outbound Delivery Request, Outbound Delivery, Site Logistics Request, Site Logistics Order, Site Logistics Lot, and iStock. Production orders, production lots, and production tasks may reference the production request. This allows an indirect determination of the product requirement specification. In some implementations, the production order, the production lot, and the production task may not reference the product requirement specification directly.

Although various steps have been described as being performed manually or computer-assisted, one skilled in the art will appreciate that such steps could be computer-assisted or performed entirely by a computer, including being performed by either hardware, software, or any other combination thereof. These techniques and components may be implemented within an Enterprise Service Architecture (ESA) environment, often termed a Service Oriented Architecture (SOA).

Although particular instances of business objects have been described, the business objects maybe represented by different or multiple business object models. In addition, different versions and/or different types of business objects may be used.

It will be understood that the foregoing methods are for illustration purposes only and that the described or similar processes and techniques may be performed at any appropriate time, including concurrently, individually, or in combination. In addition, many of the steps in this disclosure may take place simultaneously and/or in different orders than as shown. Moreover, environment 300 may use or implement similar methods with additional steps, fewer steps, and/or different steps, so long as the methods remain appropriate.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method for managing product ordering, the method comprising:
   maintaining master data describing at least one allowed product option for at least one product, wherein the at least one allowed product option determines whether a received sales order entails modification to a pre-existing product requirement specification business object;
   receiving a sales order from a sales order requestor for at least one ordered product of the at least one product, wherein the sales order includes at least one product option of the at least one allowed product option for the at least one ordered product;
   processing, using at least one hardware processor, the sales order using a product requirement specification business object, wherein the product requirement specification business object includes at least one of business requirements, business context, fulfillment specifications, modifiability indicator, or logistical processing information for the at least one ordered product, and wherein the product requirement specification business object is a collection of requirements used in a sales order for a product, contains a corresponding specification for fulfilling the collection of requirements, and generates a product requirement specification based on a received sales order and a determination of which sales order product requirements will be satisfied in the production of the product;
   determining whether to modify a pre-existing product requirement specification business object based upon the at least one product option in order to satisfy the sales order;
   generating a sales order confirmation at least partially based on the sales order;
   generating a plan for production of the at least one ordered product;
   allowing the at least one ordered product to be produced based on the plan for production; and
   generating an outbound delivery request defined by a planning product requirement specification business object, wherein the at least one ordered product is delivered to the sales order requestor based on the outbound delivery request.

2. The computer-implemented method of claim 1, wherein maintaining master data includes creating a template that includes the at least one allowed product option for the at least one ordered product.

3. The computer-implemented method of claim 1, further comprising forecasting material requirements for at least one ordered product before the sales order is received.

4. The computer-implemented method of claim 3, wherein forecasting material requirements includes estimating expected component demand before sales orders are received by referencing an existing planning product requirement specification object.

5. The computer-implemented method of claim 4, wherein the estimate is based at least partially on at least one of components, finished item level, and total demand for several finished items.

6. The computer-implemented method of claim 1, further comprising:
   retrieving a pre-existing product requirement specification business object stored in a memory of the system; and
   creating a product requirement specification based on the sales order using the retrieved product requirement specification business object.

7. The computer-implemented method of claim 6, further comprising modifying the pre-existing product requirement specification business object.

8. The computer-implemented method of claim 7, further comprising determining an expected delivery time, where the expected delivery time includes when the requestor can expect to receive the at least one ordered product in the sales order.

9. The computer-implemented method of claim 8, further comprising checking the expected delivery date based on product options in view of at least one of inventory, planned material receipts, replenishment lead time, or allocations.

10. The computer-implemented method of claim 8, wherein determining the expected delivery time based on inventory and planned material receipts comprises:
    collecting material receipts and requirements with a given material and product requirement specification;
    sorts them by date and time; and
    subtracts confirmed material demand from the inventory and expected material receipts.

11. The computer-implemented method of claim 1, further comprising
    creating a product requirement specification based on the sales order using the modified pre-existing product requirement specification business object.

12. The computer-implemented method of claim 1, wherein generating a plan for production of ordered goods includes generating a plan based on at least one of: need to contact requestor to clarify undefined product options for the at least one ordered product, a new customer requirement, a previously unknown customer requirement, or existing stock left over from other sales orders.

13. A computer program product comprising computer-readable instructions embodied on a non-transitory computer-readable storage device and operable when executed by at least one data processing apparatus to:
    maintain, using at least one hardware processor, master data describing at least one allowed product option for at least one product, wherein the at least one allowed product option whether a received sales order entails modification to a pre-existing product requirement specification business object;
    receive a sales order from a sales order requestor for at least one ordered product of the at least one product, wherein the sales order includes at least one product option of the at least one allowed product option for the at least one ordered product;
    process the sales order using a product requirement specification business object, wherein the product requirement specification business object includes at least one of business requirements, business context, fulfillment specifications, modifiability indicator, or logistical processing information for the at least one ordered product, and wherein the product requirement specification business object is a collection of requirements used in a sales order for a product, contains a corresponding specification for fulfilling the collection of requirements, and generates a product requirement specification based on a received sales order and a determination of which sales order product requirements will be satisfied in the production of the product;

determine whether to modify a pre-existing product requirement specification business object based upon the at least one product option in order to satisfy the sales order;

generate a sales order confirmation at least partially based on the sales order;

generate a plan for production of the at least one ordered product;

allow the at least one ordered product to be produced based on the plan for production; and generate an outbound delivery request defined by a planning product requirement specification business object, wherein the at least one ordered product is delivered to the sales order requestor based on the outbound delivery request.

14. The computer program product of claim 13, wherein maintaining master data includes creating a template that includes allowed product options for the at least one ordered product.

15. The computer program product of claim 13, wherein the instructions are further operable to cause the at least one data processing apparatus to perform operations comprising creating a product requirement specification using a received product requirement specification business object of the system based on the sales order.

16. A system comprising:

a memory storing at least one instruction and master data related to sales; and at least one hardware processor configured to execute the at least one instruction to:

maintain, using at least one hardware processor, master data describing at least one allowed product option for at least one product, wherein the at least one allowed product option whether a received sales order entails modification to a pre-existing product requirement specification business object;

receive a sales order from a sales order requestor for at least one ordered product of the at least one product, wherein the sales order includes at least one product option of the at least one allowed product option for the at least one ordered product;

process the sales order using a product requirement specification business object, wherein the product requirement specification business object includes at least one of business requirements, business context, fulfillment specifications, modifiability indicator, or logistical processing information for the at least one ordered product, and wherein the product requirement specification business object is a collection of requirements used in a sales order for a product, contains a corresponding specification for fulfilling the collection of requirements, and generates a product requirement specification based on a received sales order and a determination of which sales order product requirements will be satisfied in the production of the product;

determine whether to modify a pre-existing product requirement specification business object based upon the at least one product option in order to satisfy the sales order;

generate a sales order confirmation at least partially based on the sales order;

generate a plan for production of the at least one ordered product;

allow the at least one ordered product to be produced based on the plan for production; and generate an outbound delivery request defined by a planning product requirement specification business object, wherein the at least one ordered product is delivered to the sales order requestor based on the outbound delivery request.

17. The system of claim 16, wherein the at least one hardware processor is further configured to execute the at least one instruction to create a product requirement specification based upon the sales order using a product requirement specification business object.

18. The system of claim 16, wherein the at least one hardware processor is further configured to execute the at least one instruction to:

create a product requirement specification based on the sales order using the modified pre-existing product requirement specification business object.

* * * * *